United States Patent
Edo et al.

[11] Patent Number: 6,133,905
[45] Date of Patent: Oct. 17, 2000

[54] INPUT APPARATUS AND INPUT METHOD

[75] Inventors: Kenji Edo, Higashihiroshima; Keiichiro Sato, Nara; Masayasu Yamamoto, Osaka; Masashi Kakimoto, Higashihiroshima, all of Japan

[73] Assignee: Sharp Kabushiki Kaisha, Osaka, Japan

[21] Appl. No.: 09/104,190

[22] Filed: Jun. 25, 1998

[30] Foreign Application Priority Data

Nov. 13, 1997 [JP] Japan ................................. P9-312431

[51] Int. Cl.⁷ ........................................................ G09G 5/00
[52] U.S. Cl. ........................ 345/156; 345/146; 345/352; 379/93.3; 379/96
[58] Field of Search ..................................... 345/146, 123, 345/124, 125, 156, 352, 353; 379/93.3, 96, 100, 102

[56] References Cited

U.S. PATENT DOCUMENTS

| 4,924,496 | 5/1990 | Figa et al. ................................. 379/142 |
| 5,541,988 | 7/1996 | Draganoff ................................. 379/354 |
| 5,581,593 | 12/1996 | Engelke et al. ............................. 379/52 |
| 5,903,632 | 5/1999 | Brandon ................................. 379/93.23 |

FOREIGN PATENT DOCUMENTS

| 528157 | 2/1993 | Japan . |
| 749764 | 2/1995 | Japan . |

Primary Examiner—Richard A. Hjerpe
Assistant Examiner—Kimnhung Nguyen

[57] ABSTRACT

An input apparatus is capable of recognizing an order of selection of a plurality of options displayed in a display region. The input apparatus includes a display unit having the display region with a predetermined coordinate system set thereto, an operating unit including a select key assigned to a direction parallel to one reference axis set in the display region, and a display control unit. The display control unit first causes a predetermined number of options to be displayed in the display region in such an arrangement that predetermined reference points within the options do not have overlapping coordinates in the direction parallel to the reference axis, and that the options form a plurality of rows and a plurality of columns. Then, the display control unit selects one of the options. When the select key of the operating unit is operated by a user, the one option is changed according to the order of selection in response to the key operation.

12 Claims, 18 Drawing Sheets

FIG. 6

| ICON NO. DATA | POSITION DATA | DISPLAY DATA | |
|---|---|---|---|
| | | NON-SELECT | SELECT |
| 1 | | A | A' |
| 2 | | B | B' |
| 3 | COORDINATES 1 | C | C' |
| 4 | COORDINATES 2 | D | D' |
| 5 | COORDINATES 3 | E | E' |
| 6 | COORDINATES 4 | F | F' |
| 7 | COORDINATES 5 | G | G' |
| 8 | COORDINATES 6 | H | H' |
| 9 | | I | I' |
| 10 | | J | J' |

FIG. 13

| ICON NO. DATA (83) | POSITION DATA (85) | DISPLAY DATA (84) | |
|---|---|---|---|
| | | NON-SELECT | SELECT |
| 1 | | A | A' |
| 2 | COORDINATES 1 | B | B' |
| 3 | COORDINATES 2 | C | C' |
| 4 | COORDINATES 3 | D | D' |
| 5 | COORDINATES 4 | E | E' |
| 6 | COORDINATES 5 | F | F' |
| 7 | COORDINATES 6 | G | G' |
| 8 | | H | H' |
| 9 | | I | I' |
| 10 | | J | J' |

(81)

| ICON NO. DATA | POSITION DATA | DISPLAY DATA | |
|---|---|---|---|
| | | NON-SELECT | SELECT |
| 1 | | A | A' |
| 2 | | B | B' |
| 3 | | C | C' |
| 4 | COORDINATES 1 | D | D' |
| 5 | COORDINATES 2 | E | E' |
| 6 | COORDINATES 3 | F | F' |
| 7 | COORDINATES 4 | G | G' |
| 8 | COORDINATES 5 | H | H' |
| 9 | COORDINATES 6 | I | I' |
| 10 | | J | J' |

| ICON NO. DATA (83) | POSITION DATA (85) | DISPLAY DATA (84) | |
|---|---|---|---|
| | | NON-SELECT | SELECT |
| 1 | COORDINATES 1 | A | A |
| 2 | COORDINATES 2 | B | B |
| 3 | COORDINATES 3 | C | C |
| 4 | COORDINATES 4 | D | D |
| 5 | COORDINATES 5 | E | E |
| 6 | COORDINATES 6 | F | F |
| 7 | | G | G |
| 8 | | H | H |
| 9 | | I | I |
| 10 | | J | J |

| ICON NO. DATA | POSITION DATA | DISPLAY DATA | |
| --- | --- | --- | --- |
| | | NON-SELECT | SELECT |
| 1 | COORDINATES 2 | A | A' |
| 2 | COORDINATES 3 | B | B' |
| 3 | COORDINATES 4 | C | C' |
| 4 | COORDINATES 5 | D | D' |
| 5 | COORDINATES 6 | E | E' |
| 6 | | F | F' |
| 7 | | G | G' |
| 8 | | H | H' |
| 9 | | I | I' |
| 10 | COORDINATES 1 | J | J' |

| ICON NO. DATA | POSITION DATA | DISPLAY DATA | |
|---|---|---|---|
| | | NON-SELECT | SELECT |
| 1 | | A | A |
| 2 | | B | B |
| 3 | | C | C |
| 4 | | D | D |
| 5 | COORDINATES 1 | E | E |
| 6 | COORDINATES 2 | F | F |
| 7 | COORDINATES 3 | G | G |
| 8 | COORDINATES 4 | H | H |
| 9 | COORDINATES 5 | I | I |
| 10 | COORDINATES 6 | J | J |

| ICON NO. DATA | POSITION DATA | DISPLAY DATA | |
|---|---|---|---|
| | | NON-SELECT | SELECT |
| 1 | COORDINATES 6 | A | A' |
| 2 | | B | B' |
| 3 | | C | C' |
| 4 | | D | D' |
| 5 | | E | E' |
| 6 | COORDINATES 1 | F | F' |
| 7 | COORDINATES 2 | G | G' |
| 8 | COORDINATES 3 | H | H' |
| 9 | COORDINATES 4 | I | I' |
| 10 | COORDINATES 5 | J | J' |

INPUT APPARATUS AND INPUT METHOD

BACKGROUND OF THE INVENTION

1. Field of the Invention

The present invention relates to an input apparatus and input method for allowing a user to input instructions for selecting and carrying out a function, by using options individually assigned to a plurality of functions.

2. Description of the Related Art

Conventionally, a processing apparatus capable of performing a plurality of functions may have an input apparatus including an icon display device for simultaneously displaying icons, which are examples of options or symbols corresponding to the respective functions, in a display region of the display device for allowing a user to input instructions to the processing apparatus for selecting and carrying out a function. An image showing the plurality of icons in the display region is hereinafter called an icon menu. When the icon menu is displayed, the user operates what is known as cursor keys included in the input apparatus. In response to this operation, the input apparatus selects and enters one of the icons. The processing apparatus regards the function corresponding to the icon entered as being instructed for execution, and carries out this function.

The icon menu display apparatus in Japanese Unexamined Patent Publication JP-A 7-49764 (1995) and the document preparing apparatus in Japanese Unexamined Patent Publication JP-A 5-28157 (1993) may be cited as conventional examples of the above input apparatus. The icon menu display apparatus is devised to indicate, in a form readily understandable to a user, functions of a word processor corresponding to a plurality of icons used for selecting the functions. For this purpose, the apparatus presents an icon menu with a background in the form of a three-dimensional view of a workroom including a desk and a wall surface. Each icon has a pattern representing the function corresponding thereto, and is disposed in a position on the background corresponding to the pattern. In this case, the icons are arranged in a plurality of rows and columns on the background. The document preparing apparatus, in order to improve input operability of a Japanese word processor, for example, additionally displays the current date and time on an icon menu having a matrix arrangement of icons individually corresponding to a plurality of functions.

Where icons are arranged in a matrix as in these conventional examples, four cursor keys are usually provided for the user to use as an operating device for inputting instructions. The four cursor keys correspond, respectively, to opposite directions parallel to the two axes of an X-Y rectangular coordinate system set to the display region. When the processing apparatus is portable, the apparatus should preferably be designed as small as possible. It is difficult to provide four cursor keys for a portable apparatus. A portable apparatus usually includes two cursor keys corresponding to two opposite directions parallel to one of the axes of an X-Y rectangular coordinate system acting as a reference axis. That is, the two cursor keys correspond to upward and downward directions or rightward and leftward directions. The upward direction is the one in which the y-coordinate increases or decreases. The leftward direction is the one in which the x-coordinate increases or decreases.

Where, for example, the cursor keys correspond to the upward and downward directions, an icon menu 1, as shown in FIG. 31, may include a plurality of icons 2–4 arranged vertically in one column. In this case, the number of icons in the icon menu 1 tends to be smaller than the number of icons that can be displayed in a matrix at a time, provided that the same icons are arranged in the same display region.

To increase the number of icons in the icon menu 1 from the example shown in FIG. 31, an icon menu 7, as shown in FIG. 32, may include a plurality of icons 8–13 arranged in a matrix. In FIG. 32, the matrix has three rows and two columns. In inputting an instruction to select one of the icons 8–13 by operating the two cursor keys corresponding to the upward and downward directions, it is difficult to grasp and even confusing whether the upward and downward directions are given priority over the rightward and leftward directions, or vice versa, as directions in which a change is to be made to the one selected icon in response to the cursor key operation. That is, it is difficult for the user to recognize only by observing the icon menu 7 whether a cursor key operation causes the one icon to be selected by first changing to a different icon to the right or left of a currently selected icon, and then changing from the different icon to another different icon over or under it, or by first changing to a different icon over or under the currently selected icon, and then changing from the different icon to another different icon to the right or left thereof. In this case, therefore, it is difficult for the user to carry out intuitively an operation to input an instruction for selecting an icon corresponding to a desired function from among the plurality of icons.

SUMMARY OF THE INVENTION

An object of the present invention is to provide an input apparatus and method which allow an increased number of options to be displayed in a display region at a time, and indicate an order of option selection, when an instruction is to be inputted to select one of the options displayed in the display region by using an operating device associated with directions parallel to one reference axis.

In a first aspect of the invention, there is provided an input apparatus having display means including a display region with a predetermined coordinate system set thereto, and operating means assigned to a direction parallel to one reference axis set in the display region, the input apparatus comprising:

display controlling means for displaying a plurality of options composed of graphics or symbols and having a predetermined order of selection in the display region of the display means in such an arrangement that predetermined reference points within the options have not overlap coordinates in the direction parallel to the reference axis, and that the options form a plurality of rows and a plurality of columns; and selection control means for selecting one option from among the plurality of options, and changing the one option in the order of selection in response to an operation of the operating means.

According to the first aspect of the invention, the display control means of the input apparatus causes the options to be displayed in the arrangement noted above in the display region of the display means. Each option is composed of at least one of graphics and symbols, the latter including characters and signs. Consequently, the options maintain the arrangement forming rows and columns, and are not aligned to one another in a direction perpendicular to the reference axis. In this arrangement, the number of options that can be displayed in the display region at a time is substantially the same as where the same options are arranged in a matrix in the display region. Thus, a larger number of options may be displayed in the display region at a time than in the case of arranging the same options in one column in the display region. Since the options are not aligned to one another in the direction perpendicular to the reference axis, even though the options form a plurality of columns or rows in the direction parallel to the reference axis, the user of the input apparatus can easily guess the order of selection of the options only by looking at the display region.

In a second aspect of the invention, in the input means of the first aspect, the display control means of input apparatus causes a predetermined number of options including the one option selected by the selection control means, which are consecutive in the order of selection among all of the options, to be displayed in the display region.

According to the second aspect of the invention, the display control means of the input apparatus causes only a predetermined number of options among all of the options to be displayed in the above-noted arrangement in the display region. In this case, the predetermined number of options includes the one selected option. Thus, when the one option is changed, the options displayed in the display region are also changed at the same time. Consequently, the input apparatus having the above display control means is capable of successively displaying the options in the display region in response to an operation of the operating means even when a total number of options exceeds the predetermined number of options that may be displayed in the display region at a time.

In a third aspect of the invention, there is provided an input apparatus having display means including a display region with a predetermined coordinate system set thereto, and operating means assigned to a direction parallel to one reference axis set in the display region, the apparatus comprising:

display control means for arranging a plurality of options composed of graphics or symbols and having a predetermined order of selection in a virtual region having a larger width than the display region, in such an arrangement that predetermined reference points within the options have not overlap coordinates in the direction parallel to the reference axis, and that the options form a plurality of rows and a plurality of columns, and for displaying a portion of the virtual region congruent with the display region in the display region of the display means; and selection control means for selecting one option from among the plurality of options, and changing the one option in the order of selection in response to an operation of the operating means.

According to the third aspect of the invention, the display control means of the input apparatus arranges all the options in the arrangement noted above in the virtual region, and causes only a portion of the virtual region to be displayed in the display region. That is, this input apparatus has a scroll function for displaying, in the display region, a portion of the virtual region in which all the options are arranged. Consequently, the input apparatus is capable of successively displaying the options in the display region in order even when a total number of options exceeds the predetermined number of options that may be displayed in the display region at a time. Further, with the display control means causing the portion including the one option and congruent with the display region to be displayed in the display region, the portion displayed in the display region may be changed in response to an operation by the user to change the option.

In a fourth aspect of the invention, in the input apparatus of the second or third aspect, the display control means of input apparatus causes, when there is an option outside the display region and consecutive in the order of selection with one of the options disposed closest to an end in the direction parallel to the reference axis of the display region, a predetermined graphic in the display region for indicating presence of such an option to be additionally displayed.

According to the fourth aspect of the invention, the display control means of the input apparatus causes the above-noted graphic to be displayed besides the options. Thus, the user may readily determine, only by looking at the display region, whether there is a hidden option consecutive with the option displayed at the end of the display region, which hidden option lies next to the option displayed at the end or in a different position. This feature facilitates use of the input apparatus.

In a fifth aspect of the invention, in the input apparatus of the second or third aspect, the selection control means of the input apparatus changes the one option selected to the last or first option in the order of selection, when the one option selected is the first or last option in the order of selection and the operating means is operated.

According to the fifth aspect of the invention, the selection control means of the input apparatus changes the one option as described above. As a result, the order of selection becomes endless. Thus, all the options may be displayed successively in circulation in response to operations entered by the user. This renders the user's operation easier for designating an option to be selected ultimately than where the order of the selection is not endless, which facilitates use of the input apparatus.

In a sixth aspect of the invention, in the input apparatus of the first aspect, the display control means of the input apparatus increases or decreases coordinates of the options in the direction parallel to the reference axis, with an increase in number in the order of selection.

According to the sixth aspect of the invention, the display control means of the input apparatus displays the plurality of options in the way described above, based on the order of selection. Consequently, the order of arrangement in the direction parallel to the reference axis of the options displayed in the display region agrees with the order of selection. Based on the arrangement of the options, the user may be able to guess the order of selection of the options easily and naturally. It is also possible to show the change of the one option being effected in a natural order based on the arrangement. This makes the order of selection clear while maintaining the arrangement forming rows and columns. Movement of the display control means may be applied to the display control means of the input apparatus of the third aspect to produce the same effect as the above effect.

In a seventh aspect of the invention, in the input apparatus of the first aspect, a sawtooth-like line is formed by linking the reference points of the plurality of options in the order in which the coordinates increase in the direction parallel to the reference axis.

According to the seventh aspect of the invention, the display control means of the input apparatus displays the plurality of options with the reference points arranged in a sawtooth-like form. Consequently, the plurality of options appear to the user to be arranged along one sawtooth-like curved line while maintaining the arrangement forming rows and columns. Thus, the user may be able to guess the order of selection of the options naturally. The order of selection may be made clear while retaining the arrangement composed of rows and columns. The arrangement of the options of the seventh aspect may be applied to the input apparatus of the third aspect to produce the same effect as the above effect.

In an eighth aspect of the invention, there is provided an input method in which a plurality of options composed of graphics or symbols and having a predetermined order of selection are displayed in a display region with a predetermined coordinate system set thereto, and one option is selected from among the plurality of options by an operation assigned to a direction parallel to one reference axis set in the display region, the input method comprising:

causing the plurality of options to be displayed in the display region in such an arrangement that predetermined reference points within the options have not overlap coordinates in the direction parallel to the reference axis, and that the options form a plurality of rows and a plurality of columns; and changing the one option in the order of selection each time the operation is carried out.

According to the eighth aspect of the invention, the above input method causes the options to be displayed in the arrangement noted above in the display region. For the reason discussed in relation to the first aspect, a larger number of options may be displayed in the display region at a time than in the case of arranging the same options in one column in the display region. Further, the user of the input apparatus can easily guess the order of selection of the options only by looking at the display region.

In a ninth aspect of the invention, in the input method of the eighth aspect, a predetermined number of options including the one option selected, which are consecutive in the order of selection among all of the options, are displayed in the display region.

According to the ninth aspect of the invention, in the above-noted input method, only a predetermined number of options among all of the options are displayed in the above-noted arrangement in the display region. Consequently, for the same reason discussed in relation to the second aspect, the input method is capable of successively displaying the options in the display region even when a total number of options exceeds the predetermined number of options that may be displayed in the display region at a time.

In a tenth aspect of the invention, an input method is provided in which a plurality of options composed of graphics or symbols and having a predetermined order of selection are displayed in a display region with a predetermined coordinate system set thereto, and one option is selected from among the plurality of options by an operation assigned to a direction parallel to one reference axis set in the display region, the input method comprising:

arranging the plurality of options in a virtual region having a larger width than the display region in such an arrangement that predetermined reference points within the options have not overlap coordinates in the direction parallel to the reference axis, and that the options form a plurality of rows and a plurality of columns, and displaying a portion of the virtual region congruent with the display region in the display region; and changing the one option in the order of selection each time the operation is carried out.

According to the tenth aspect of the invention, the display method arranges all the options in the arrangement noted above in the virtual region, and causes only a portion of the virtual region to be displayed in the display region. That is, this input method, with a scrolling operation, displays in the display region a portion of the virtual region in which all the options are arranged. Consequently, the input method is capable of successively displaying the options in the display region even when a total number of options exceeds the predetermined number of options that may be displayed in the display region at a time.

In an eleventh aspect of the invention, in the input method of the ninth or tenth aspect, when there is an option outside the display region and consecutive in the order of selection with one of the options disposed closest to an end, in the direction parallel to the reference axis, of the display region, a predetermined graphic is displayed additionally in the display region for indicating presence of such an option.

According to the eleventh aspect of the invention, the input method displays the above-noted graphic besides the options. Thus, the user may readily recognize, only by looking at the display region, presence of an option in addition to those options displayed in the display region.

In a twelfth aspect of the invention, in the input method of the ninth or tenth aspect, when the one option selected is the first or last option in the order of selection and the operation is carried out, the one option selected is changed to the last or first option in the order of selection.

According to the twelfth aspect of the invention, the input method changes the one option as described above. For the reason discussed in relation to the seventh aspect, this simplifies the user's operation for selecting an option.

BRIEF DESCRIPTION OF THE DRAWINGS

Other and further objects, features, and advantages of the invention will be more explicit from the following detailed description taken with reference to the drawings wherein:

FIG. 6 is a view showing a storage state after initialization of a menu data table 81.

FIG. 13 is a view showing a storage state of the menu data table 81 after a change operation in the third case.

DETAILED DESCRIPTION OF THE PREFERRED EMBODIMENTS

Figure 1:
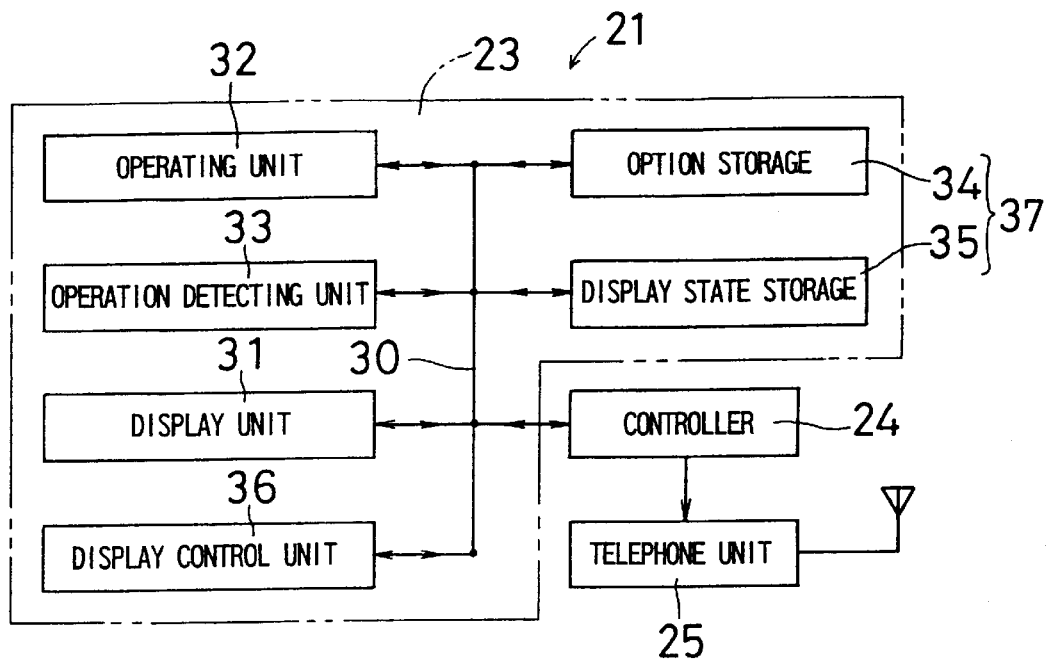
FIG. 1 is a block diagram showing an electrical structure of a portable telephone 21 including an input apparatus 23 in one embodiment of the present invention.

Now referring to the drawings, preferred embodiments of the invention are described below.

Figure 2:
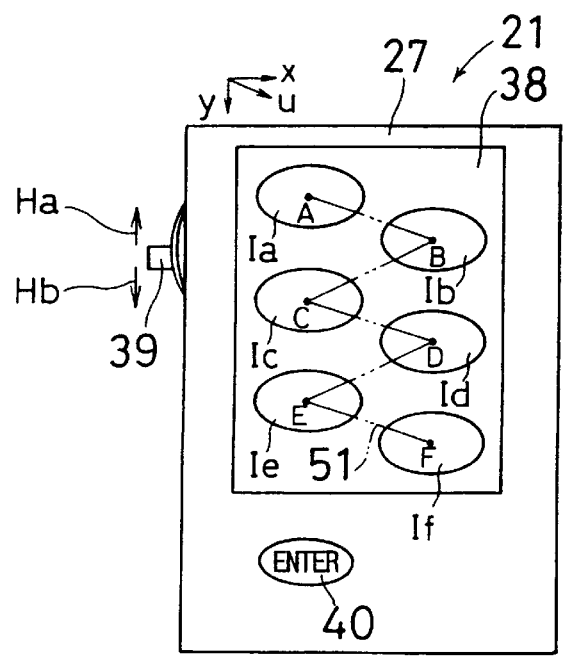
FIG. 2 is a front view showing an outward appearance of the portable telephone 21.

FIG. 1 is a block diagram showing an electrical structure of a portable telephone 21 including an input apparatus 23 in one embodiment of the present invention. FIG. 2 is a front view showing an outward appearance of the portable telephone 21. FIGS. 1 and 2 will be described in combination. The portable telephone 21 includes the input apparatus 23, a controller 24 and a telephone unit 25. The input apparatus 23, controller 24 and telephone unit 25 are mounted in a case 27. The input apparatus 23 includes a display unit 31, an operating unit 32, an operation detecting unit 33, a option storage 34, a display state storage 35 and a display control unit 36. The respective units and storages 31 to 36 and controller 24 are interconnected through a bus 30 for exchanging signals and data.

The input apparatus 23 is operable by a user to input an instruction for designating one of a plurality of processing operations preset to the portable telephone 21 or one of a plurality of data set stored in the portable telephone 21. The controller 24 controls a whole system of the portable telephone 21 including the input apparatus 23 and telephone unit 25. The telephone unit 25 includes all components of the portable telephone 21 except the input apparatus 23 and controller 24, as well as programs and data for controlling such components. When the user inputs an instruction from the input apparatus 23, the controller 24 controls operation of the telephone unit 25 based on the data and processing operation thereby designated. That is, the telephone unit 25 is a controlled unit controllable by the controller 24 based on inputs from the input apparatus 23.

The display unit 31 includes a display region 38 with a predetermined coordinate system set thereto for displaying characters and graphics. The operating unit 32 includes a select key 39 and an enter key 40 operable by the user. Operations of the select key 39 are assigned to two opposite directions parallel to a reference axis preset to the display region 38. For example, the select key 39 is operable, with a cursor displayed in the display region 38, to instruct a movement of the cursor in one of the two directions. The display region 38 and enter key 40 are arranged on the front surface of the case 27 of portable telephone 21, while the select key 39 is attached to a side surface of the case 27. The display unit 31 is in the form of a liquid crystal display, for example. The select key 39 may be in the form of a seesaw switch or lever switch which is tiltable in two directions Ha and Hb corresponding to the two opposite directions noted above.

In this embodiment, the display region 38 is assumed to define a two-dimensional plane, the coordinate system being an X-Y rectangular coordinate system with the x-axis extending parallel to the rightward and leftward directions in the drawings, and the y-axis extending parallel to the upward and downward directions in the drawings. Thus, the rightward and leftward directions may be referred to collectively as x-direction, and the upward and downward directions as y-direction. It is assumed also that the display region 38 is larger in y-direction than in x-direction, and that the y-axis is selected as the reference axis. It is further assumed that the y-coordinate increases downward and the x-coordinate increases rightward in the drawings. That is, operations of the select key 39 are assigned to the upward and downward directions parallel to the y-axis, to designate upward and downward movements of the cursor.

The operation detecting unit 33 is responsive to an operation of the operating unit 32 to detect how the operating unit 32 is operated. The option storage 34 stores data for identifying a plurality of predetermined options, and for displaying the options in the display region 38 of display unit 31. The options are each composed of at least one of graphics and symbols, and are individually assigned, for example, to predetermined processing operations which are the functions of the portable telephone 21 and to various data stored in the portable telephone 21. The symbols herein are a broad concept including both signs and characters. In FIG. 2, the options are expressed by letters of the alphabet in ellipses.

The display state storage 35 stores data for identifying, among all the options, a predetermined number of options currently displayed on the display unit 31, and one option currently selected in response to an operation of the operating unit 32. The predetermined number of options displayed by the display unit 31 are hereinafter referred to as "a group of options in the displayed range". The one option mentioned above is a candidate option corresponding to the processing operation or data designated by the user for selection and execution by the controller 24, and is hereinafter referred to as "a processing candidate option". A predetermined order of selection is set to all the options stored in the option storage 34, for selecting a processing candidate in response to an operation of the operating unit 32.

Roughly, the display control unit 36 selects a processing candidate option and a group of options in the displayed range stored in the display state storage 35 from among the plurality of options stored in the option storage 34, and causes the group of options in the displayed range to be displayed in the display region 38 of display unit 31, as arranged in a plurality of columns parallel to the reference axis, with no overlapping of y-coordinates of predetermined reference points of the respective options. The reference point of each option may be located anywhere in the option, and is assumed here to be at the center of the option. The display control unit 36 causes the processing candidate option to be displayed in a second display mode different from a first display mode in which the option is displayed when not selected to be the processing candidate. In the following description, an image presenting a group of options in the displayed range in the foregoing arrangement in the display region 38 is called a selection menu. Each time the select key 39 is operated, the display control unit 36 changes the processing candidate option from a currently selected option to an option immediately preceding or succeeding it in the order of selection.

The option storage 34 and display state storage 35 may be provided by storage regions set in an erasable memory 37. The operation detecting unit 33, display control unit 36 and controller 24 may be provided, for example, by arithmetic operations of a single central processing circuit. In this case, each of the units 24, 33 and 34 corresponds to a series of processing routines in a program executed by the central processing circuit. Naturally, each of the storages 35 and 36 may be provided by a separate memory, and each of the operation detecting unit 33, display control unit 36 and controller 24 by an individual arithmetic circuit. Any two of the operation detecting unit 33, display control unit 36 and controller 24 may share the same arithmetic circuit.

Figure 3:
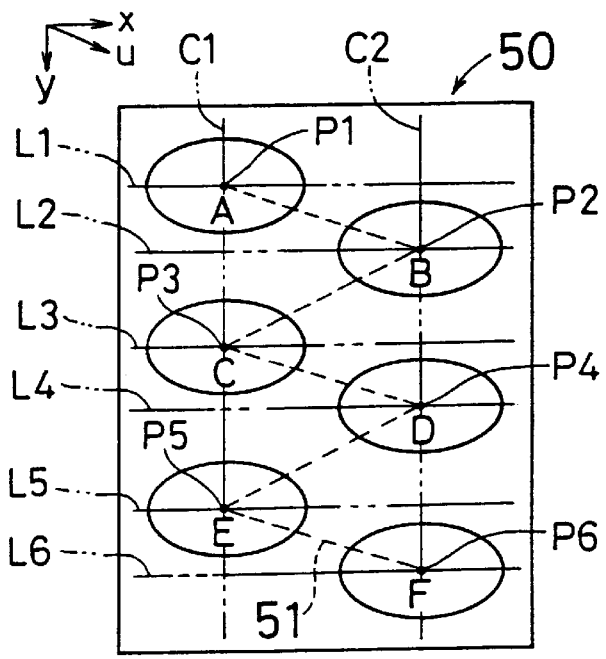
FIG. 3 is an explanatory view of a standard arrangement of options.

FIG. 3 shows a selection menu 50 which illustrates a standard arrangement of options displayed in the display region 38. The standard arrangement in this embodiment is based on a virtual lattice having intersections of a plurality of parallel segments extending parallel to the reference axis and a plurality of perpendicular segments extending perpendicular to the reference axis. In this arrangement, one of all intersections on each perpendicular segment is set as a display position. The display position is a position for setting the reference point of each option when displaying a group of options in the displayed range in the display region 38. For example, the one display position on each perpendicular line is selected from the intersections remaining after excluding intersections where that perpendicular segment crosses parallel segments extending through intersections corresponding to display positions on other, adjacent perpendicular segments.

A plurality of display positions selected in this way have different coordinates in the direction parallel to the reference axis. Each display position has a coordinate in the direction perpendicular to the reference axis different from those of display positions on the other perpendicular segments adjacent the perpendicular segment extending through that display position. That is, assuming an oblique direction neither parallel nor perpendicular to the reference axis, intersections of a plurality of imaginary segments parallel to the oblique direction and the parallel segments in the virtual lattice correspond to the display positions. This oblique direction is, for example, parallel to a diagonal line of a rectangle with vertices located at a given intersection in the virtual lattice and an intersection of parallel and perpendicular segments adjacent the parallel and perpendicular segments extending through the given intersection. The plurality of parallel segments forming the virtual lattice may or may not be arranged equidistantly. The plurality of perpendicular segments also may or may not be arranged equidistantly.

In this embodiment, the standard arrangement is based on a virtual lattice including n columns C1–Cn parallel to the y-axis and m rows L1–Lm parallel to the x-axis, in which display positions P1–Pm are set one to each row. M and n are arbitrary natural numbers 2 or more, respectively. In the example shown FIG. 3, m is 6 and n is 2, and six reference positions are set to the virtual lattice of six rows and two columns. In this standard arrangement, all the display positions have different y-coordinates, and the x-coordinate of each display position is different from the x-coordinate of the display position closest thereto in y-coordinate. In the following description, these display positions are called first to mth display positions P1–Pm in the ascending order of y-coordinates. The first to mth display positions P1–Pm have predetermined coordinates in the display region 38, which are stored in the display control unit 36, for example. A sawtooth-shaped standard arrangement line 51 extends through the first to mth display positions P1–Pm in the ascending order of y-coordinates, which is an imaginary broken line consisting of a succession of segments linking display positions P1 and P2; . . . ; and Pm-1 and Pm. That is, the group of options in the displayed range is arranged such that the reference points of the options are successively arranged on the standard arrangement line 51.

Preferably, the reference points of the group of options in the displayed range are arranged in the above standard arrangement in the display region 38 such that the earlier an option is in the order of selection, the smaller or larger y-coordinate its reference point has. Thus, the display control unit 36 in this embodiment arranges the reference points such that the earlier in the order of selection, the larger y-coordinate the reference point has. The options in the group of options in the displayed range are displayed in the first to sixth display positions in an order from later-selected option to earlier-selected option, with the standard arrangement line 51 extending through the reference points of the options in that order.

An outline of operation of the portable telephone 21 using the input apparatus 23 will be described hereinafter. First, in the input apparatus 23, the display control unit 36 causes a plurality of options to be displayed in the foregoing arrangement in the display region of display unit 31 based on the data stored in the option storage 34 and display state storage 35, and on the results of detection provided by the operation detecting unit 33. Next, the user operates the select key 39 and enter key 40 of the operating unit 32 to select one option to be processed from among the plurality of options, and make the selection definite. Finally, the display control unit 36 transmits which option has been selected, as an instruction inputted by the user, to the controller 24. As a result, the controller 24 controls the telephone unit 25 based on a processing operation or a data set corresponding to the selected option. That is, the controller 24 controls the operation of telephone unit 25, which is a controlled unit, based on the option selected through the input apparatus 23 in the described manner. The above is an outline of operation of the portable telephone 21.

First and second examples of the way in which the input apparatus 23 is used with the portable telephone 21 will be described hereinafter.

Figure 4:
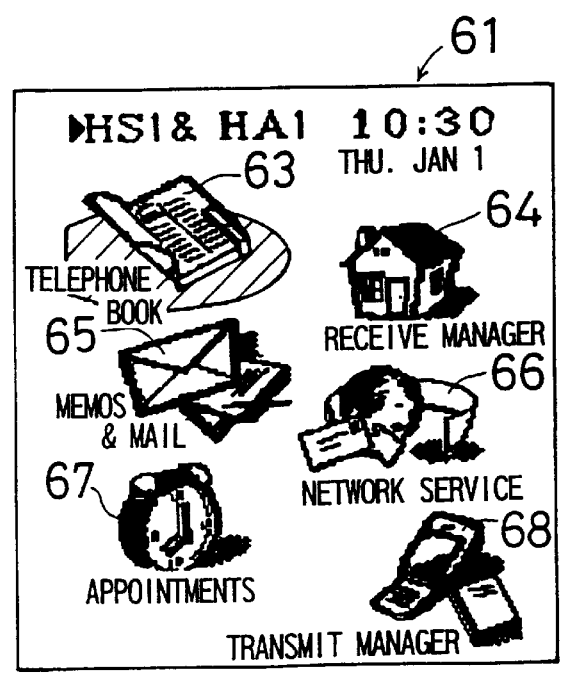
FIG. 4 is a view showing a first example of selection menu 61.

FIG. 4 shows a selection menu 61 in the first example.

The selection menu 61 in the first example is used in a top menu processing for selecting one function to be performed from among a plurality of functions provided for the portable telephone 21 besides the function to transmit and receive sound. In the top menu processing, the options are in the form of icons which are graphics assigned to the functions that may be performed by the telephone unit 25. The selection menu 61 includes first to sixth options 63–68 arranged in the order of selection and in the standard arrangement with six display positions set to the virtual lattice of six rows and two columns using the y-axis as a reference axis.

The first option 63 is assigned to a telephone book function for allowing the user to look through and revise stored telephone data including a plurality of telephone numbers and names of owners of these telephone numbers. The second option 64 is assigned to a reception log function for enabling checking of a record of messages received by the portable telephone 21. The third option 65 is assigned to a handwritten memo/handwritten mail function for accepting and storing characters inputted by using a handwritten character input function. The fourth option 66 is assigned to an Internet function for performing processes relating to the Internet. The fifth option 67 is assigned to a scheduler function for arranging schedules. The sixth option 68 is assigned to a transmission log function for enabling checking of a record of messages transmitted from the portable telephone 21.

Currently, the first option 63 is selected as a processing candidate, and is displayed in the second display mode. The second to sixth options 64–68 are displayed in the first display mode. The second display mode for displaying each of the options 63–68 in the first selection menu is a mode in which, against a graphical background of a booklet or the like serving as the first display mode, an ellipse is displayed in a different color to the background. In FIG. 4, a hatched area represents the ellipse of different color to the background. When the user inputs an instruction to select and confirm one of the first to sixth options 63–68 to the input apparatus 23, the controller 24 causes the telephone unit 25 to perform the function corresponding to the selected option.

Figure 5:
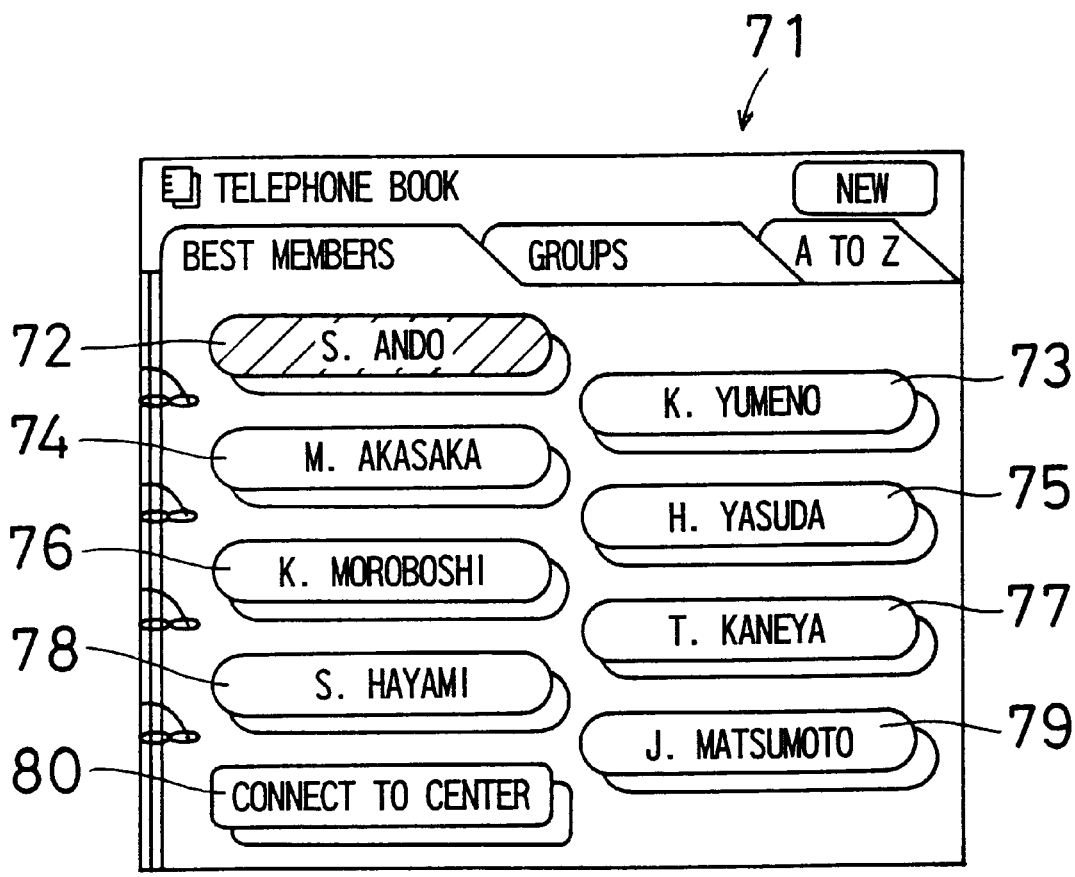
FIG. 5 is a view showing a second example of selection menu 71.

FIG. 5 shows a selection menu 71 in the second example. The selection menu 71 in the second example is used for the telephone book function noted above. When the telephone book function is performed, a plurality of telephone numbers stored beforehand are displayed in an arrangement based on the names of owners of the telephone numbers. The selection menu 71 includes first to ninth options 72–80 arranged in the order of selection and in the standard arrangement with nine display positions set to a virtual lattice of nine rows and two columns using the y-axis as a reference axis. The first to eighth options 72–79 are in the form of character strings representing the owners names, which are linked to the telephone numbers of the respective owners. The ninth option 80 is assigned to the telephone number of the base station of the portable telephone 21, and a character string indicating so is used as the option. The telephone number of the base station is used when the user uses, through the portable telephone 21, various services provided by the portable telephone company.

Currently, the first option 72 is selected as a processing candidate, and is displayed in the second display mode. The second to ninth options 73–80 are displayed in the first display mode. In the second display mode for displaying each of the options 72–80 in the second selection menu, the character strings and the interiors of the enclosing ellipses are displayed in different colors to the first display mode. In FIG. 5, a hatched area represents the ellipse of different color. When the user inputs an instruction to select and confirm one of the first to ninth options 72–80 to the input apparatus 23, the controller 24 retrieves a telephone number corresponding to the selected option from telephone book data stored in the telephone unit 25, for display in the display region 38. This telephone number may be given to a modem of the telephone unit 25 to make an outgoing call.

By displaying processing candidate options in the different display mode to the other options as in the first and second selection menus 61 and 71, the user can recognize the current processing candidate options simply by looking at the selecting menus. This facilitates use of the input apparatus 23. The option in the second display mode may take any other form as long as the user can visually distinguish this option from the options in the first display mode. For example, the options in the first display mode may be reversed in black and white, or the option in the second display mode may be expressed by a symbol entirely different from the options in the first display mode. Further, an animated image may be used when changing an option displayed by the display unit 31 from the first display mode to the second display mode.

FIG. 6 shows a menu data table 81 set to the memory 37. The menu data table 81 includes a group of number data 83, a group of display data 84 and a group of arranging position data 85. The option storage 34 and display state storage 35 are provided by functionally dividing this menu data table 81. The number data group 83 and display data group 84 correspond to the option storage 34, while the arranging position data group 85 corresponds to the display state storage 35. Of course, the display state storage 35 further includes regions for storing selected processing candidate options. The respective groups 83–85 have the same number of storage regions called cells. The cells of groups 83–85 forming each row in FIG. 6 are in a corresponding relationship.

The number data group 83 has option numbers individually stored in the cells for identifying the plurality of options preset to the input apparatus 23. This embodiment will be described on the assumption that the larger the option number is, the later the corresponding option is in the order of selection. Thus, the lower rows in the menu data table 81 as illustrated are assumed to store data relating to the later options in the order of selection.

Each cell of the display data group 84 is divided into two parts which store display data for causing the display unit 31 to display, in the first and second display modes, the option having an option number stored in the corresponding cell for the group of number data 83. The display data for the first display mode is used when the option is not selected as a processing candidate. The display data for the second display mode is used when the option is selected as a processing candidate. FIG. 6 shows the cells filled with the graphics and characters constituting the options to indicate the display data of the options stored in the cells. In FIG. 6, each option in the first display mode is represented by a graphic consisting of a letter of the alphabet enclosed in an ellipse, while each option in the second display mode is represented by a hatched version of the graphic used for the first display mode.

Among all the cells for the arranging position data group 85, the cells corresponding to the cells for the number data group 83 storing the option numbers of the options in the displayed range store coordinates of display positions where the reference points of these option should be arranged. No data are stored in those cells of the arranging position data group 85 which correspond to the cells of the number data group 83 storing the option numbers of options other than the group of options in the displayed range. In the drawing of this embodiment, the coordinates of the first to sixth display positions are expressed as "coordinates 1" to "coordinates 6".

Figure 7:
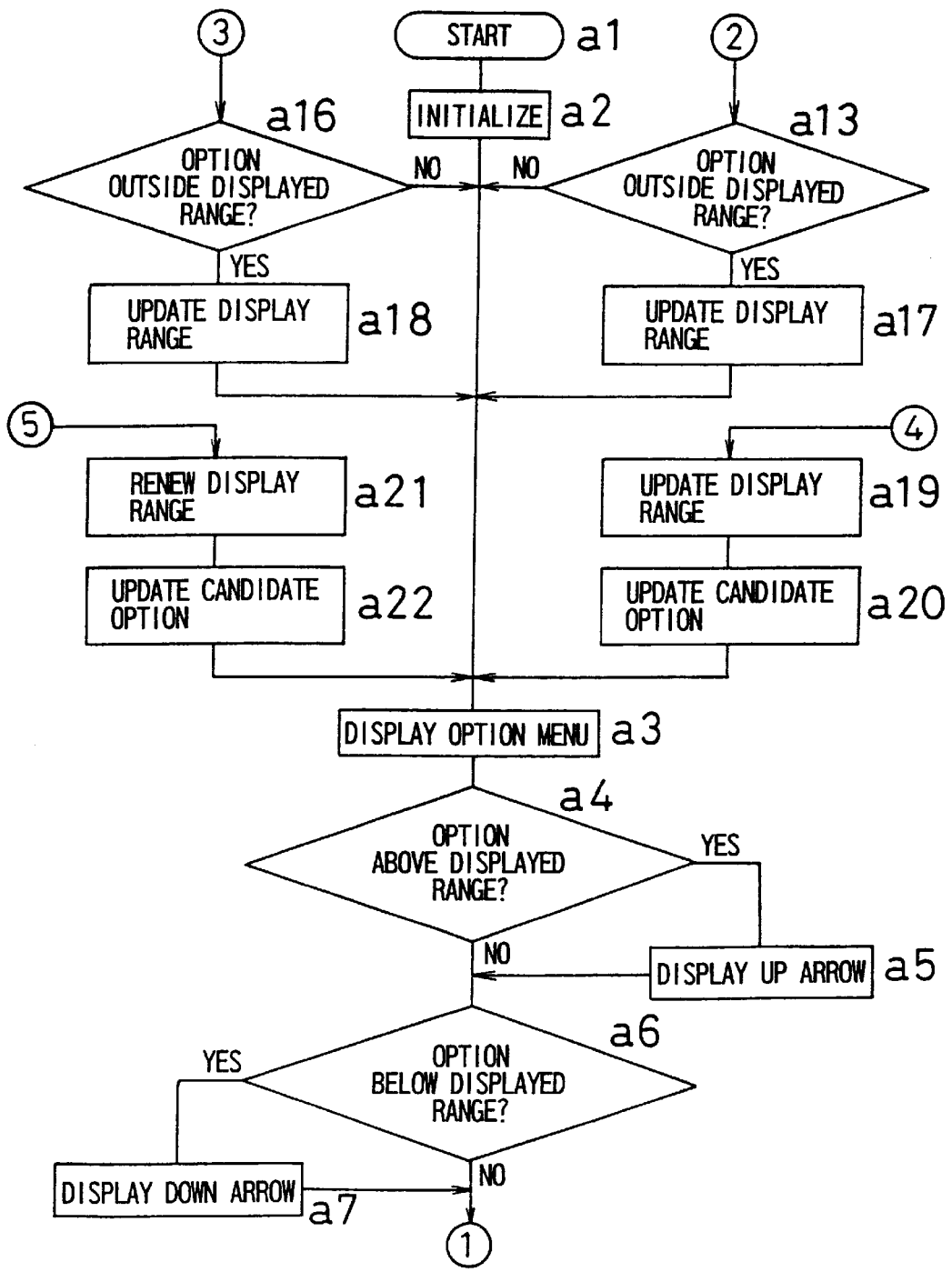
FIG. 7 is a flow chart of a designating operation of the input apparatus 23.
Figure 8:
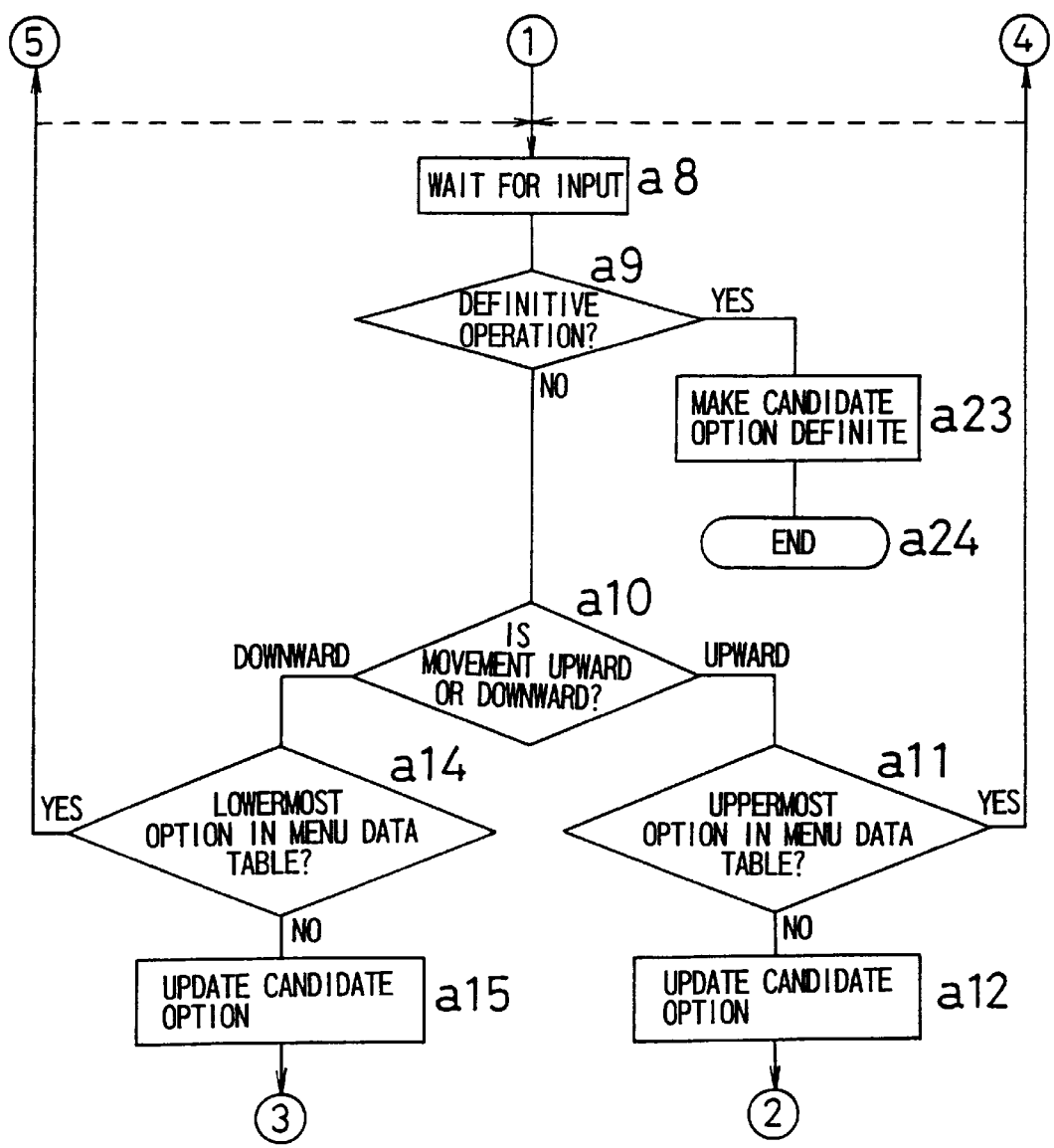
FIG. 8 is a flow chart of the designating operation of the input apparatus 23.
Figure 9:
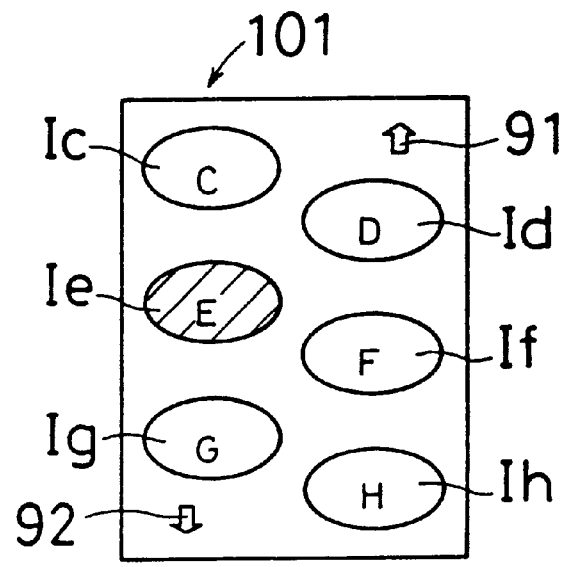
FIG. 9 is a view of a selection menu 101 displayed after initialization in the designating operation observed in a first case.

FIGS. 7 and 8 are flow charts illustrating details of the option designating operation of the input apparatus 23. FIGS. 9–12, 14, 15, 17, 18, 21, 22 and 25 show selection menus 101–111 displayed in the display region 38 of display unit 31 during the option designating operation. FIG. 6 described hereinbefore, and FIGS. 13, 16, 19, 20, 23 and 24 show storage states of the menu data table 81 at points of time when the respective selection menus 101 and 106–111 are displayed. The option designating operation will be described in detail as divided into first to six cases, with reference to FIGS. 6 through 25. The following description will be made on the assumptions that the plurality of options are ten options Ia–Ij as in the menu data table 81 of FIG. 6, and that the standard arrangement is the arrangement described with reference to FIG. 3.

First, an option designating operation in the first case will be described. The first case occurs when the processing candidate option is one in the group of options in the displayed range other than the option with the reference point having a maximum y-coordinate, and the user operates the select key 39 once in the upward tilting direction Ha.

The operation proceeds from step a1 to step a2 at a point of time when the processing changes from any one of the plurality of applications provided for the portable telephone 21 to another that uses the selection menus. At step a2, the display control unit 36, by way of initialization, selects a processing candidate option and a group of options in the displayed range from among the options Ia–Ij. The option number of the option selected in this initialization as the processing candidate is stored in the display state storage 35. Further, in the display state storage 35, coordinates of the plurality of display positions P1–Pm are stored in the ascending order of y-coordinates corresponding to the order of selection, in the cells assigned to the arranging position data group 85 corresponding to the options selected in this initialization as the display range. Arranging position data in the remaining cells are deleted therefrom. After the initialization, the operation proceeds from step a2 to step a3.

The option selected as the processing candidate may, for example, be a predetermined one of all options Ia–Ij, or the last option selected as the processing candidate in a preceding designating operation. Similarly, the group of options in the displayed range may be predetermined options among the plurality of options Ia–Ij, or the last group of options selected in the preceding designating operation. The user may advantageously set to the input apparatus 23 beforehand, as a mode of initialization, how the processing candidate option and the group of options in the displayed range should be selected in the initialization. That is, in the initialization, the option to be processed and the group of options in the displayed range may be selected based on a mode of initialization desired by the user. It is assumed that the processing candidate option is included in the group of options in the displayed range selected in the initialization. The following description will be made on the assumption that, in the initialization, the fifth option Ie in the order of selection is selected as the processing candidate, and the third to eighth options Ic–Ih as the display range. As shown in FIG. 6, the menu data table 81 stores, at this point of time, coordinates of the first to sixth display positions P1–P6 in the third to eighth cells assigned to the arranging position data group 85.

Next, at step a3, the display control unit 36 causes the group of options in the displayed range to be displayed in the standard arrangement in the display region 38 of display unit 31, based on the current storage states of the option storage 34 and display state storage 35. Specifically, display data are read from the cells of the group of display data 84 corresponding to the cells of the arranging position data group 85 storing the coordinates of the display positions. These display data are used to display the options in the display region 38, such that the coordinates of the reference points of these options agree with the coordinates stored in the cells of the arranging position data group 85. At this time, the processing candidate option is displayed by using display data for the second display mode, while the remaining options in the group of options in the displayed range are displayed by using display data for the first display mode.

Next, at step a4, the display control unit 36 determines whether there is an option among all options Ia–Ij which should be displayed above the current group of options in the displayed range, i.e. whether there is an option earlier in the order of selection than the current group of options in the displayed range. When there is an option to be displayed above, the operation proceeds from step a4 to step a5 whereupon the display control unit 36 causes a first predetermined sign 91 to be displayed in a predetermined position in the display region 38 to indicate that there is an option to be displayed above. Then, the operation proceeds to step a6. When there is no option to be displayed above, the operation jumps from step a4 to step a6.

At step a6, the display control unit 36 determines whether there is an option among all options Ia–Ij which should be displayed below the current group of options in the displayed range, i.e. whether there is an option later in the order of selection than the current group of options in the displayed range. When there is an option to be displayed below, the operation proceeds from step a6 to step a7 whereupon the display control unit 36 causes a second predetermined sign 92 to be displayed in a predetermined position in the display region 38 to indicate that there is an option to be displayed below. Then, the operation proceeds to step a8. When there is no option to be displayed below, the operation jumps from step a6 to step a8.

Thus, steps a3–a7 executed by the display control unit 36 constitute a display process for displaying a selection menu in the display region 38 of display unit 31 based on the data currently stored in the option storage 34 and display state storage 35. Further, steps a4–a7 constitute a process for determining whether there is, among all the options, an option that is earlier in the order of selection than the option earliest in the order of selection in the current group of options in the displayed range, and an option that is later in the order of selection than the option latest in the order of selection in the current group of options in the displayed range, and displaying signs indicating that there are such options when applicable. When the menu data table 81 stores data as shown in FIG. 6, the display process results in the display of the selection menu 101 shown in FIG. 9. The selection menu 101 includes options Ic–Ih displayed in the standard arrangement. The first and second signs 91 and 92 are also displayed. In this embodiment, the first sign 91 is displayed as an up arrow adjacent an upper end of the display region 38, while the second sign 92 is displayed as a down arrow adjacent a lower end of the display region 38. Further, the processing candidate option Ie is displayed in the second display mode, and the remaining options Ic, Id and If–Ih in the first display mode. Thus, the reference points of the group of options in the displayed range have the larger y-coordinates, the later the options are in the order of selection.

At step a8, the operation detecting unit 33 checks whether the operating unit 32 is operated by the user, and waits for an operation of the operating unit 32. When the user operates the select key 39 or enter key 40, the operation detecting unit 33 responds to the operation and determines that the operating unit 32 has been operated. Then, the processing operation proceeds from step a8 to step a9. Step a9 is executed to determine whether the operation detected by the operation detecting unit 33 is a definitive operation or not. In this embodiment, a definitive operation is effected by pressing the enter key 40. When the detected operation is a definitive operation, the processing operation proceeds from step a9 to step a23. When the detected operation is not a definitive operation, it is an operation to instruct a change of the processing candidate option. Then, the processing operation proceeds from step a9 to step a10. In this embodiment, a change operation is made by tilting the select key 39. It is assumed here that the user instructs an upward movement of the cursor when instructing a change of the processing candidate option in the ascending order of selection, and a downward movement of the cursor when instructing a change of the processing candidate option in the descending order of selection.

At step a10, the operation detecting unit 33 determines whether the direction of movement designated by operating the select key 39 is upward or downward. That is, it is determined whether the processing candidate option is changed in the ascending order of selection or in the descending order of selection. When the movement is upward, the operation proceeds from step a10 to step a11. When the movement is downward, the operation proceeds from step a10 to step a14. In the first case of designating operation, the select key 39 is tilted at this point in the direction Ha corresponding to the upward movement. Thus, the processing operation proceeds to step a11.

At step a11, the display control unit 36 determines whether the current processing candidate option is the first option Ia in the order of selection, i.e. the option Ia having option No. 1. When it is the first option Ia, the operation proceeds from step a11 to step a19. Otherwise, the operation proceeds from step a11 to step a12. In the first case of designating operation, the current processing candidate option is the fifth option Ie, and therefore the decision made at step a11 is negative. The processing operation then proceeds to step a12.

At step a12, the display control unit 36 acts as a selection controller for changing the option selected for processing. At this point, the selection controller changes the processing candidate option to the option immediately preceding the currently selected option in the order of selection. Specifically, the selection controller selects the option immediately preceding the currently selected option in the order of selection, and changes the option number of the processing candidate option stored in the display state storage 35 to the option number of the selected option. In the first case of designating operation, the processing candidate option is changed from the fifth option Ie to the fourth option Id.

At step a13, the display control unit 36 determines whether the processing candidate option updated at step a12 is excluded from the current group of options in the displayed range This range of display is the one used in the latest execution of step a3. When the new processing candidate option is not in the current group of options in the displayed range, the operation proceeds from step a13 to step a17. When the new processing candidate option is included in the current group of options in the displayed range, the operation returns straight from step a13 to step a3. In the first case of designating operation, the processing candidate option is the fourth option Id and the group of options in the displayed range includes the third to eighth options Ic–Ih. Consequently, the decision made at step a13 is negative, and the processing operation returns straight to step a3.

Figure 10:
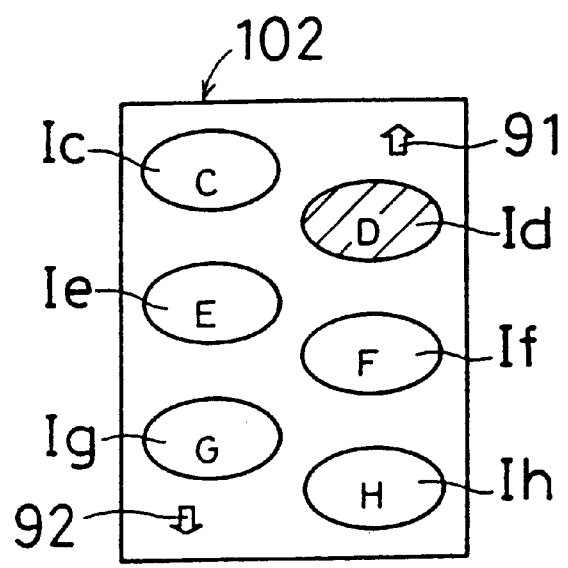
FIG. 10 is a view of a selection menu 102 displayed in the designating operation observed in the first case.

When steps a3–a7 are repeated twice or more in one designating operation, the display control unit 36 executes steps a3–a7 as described above, based on the data then stored in the option storage 34 and display state storage 35, after erasing the selection menu already displayed in the display region 38 at the point of time the processing is started. As a result, the selection menu 102 shown in FIG. 10 is displayed in the display region 38. This selection menu 102 is different from the selection menu 101 in FIG. 9 in that the fourth option Id is displayed in the second display mode and the fifth option Ie is now displayed in the first display mode. The two menus are the same in the other respects. After displaying the selection menu 102, the operation detecting unit 33 and display control unit 36 wait at step a8 for an operation to be instructed by the user, and selectively and repeatedly execute steps a9–a22 in response to such an operation.

When the user makes a definitive operation in the state of standby at step a8, the processing operation proceeds from step a9 to step a23. At step a23, the display control unit 36 acts as the selection controller again to establish, as an option to be processed, the option currently selected as the processing candidate and having the option number stored in the display state storage 35. The option number of the option made definite is applied to the controller 24. After making the option number of the option definite, the designating operation is terminated at step a24. Upon termination of this designating operation, the controller 24 controls the telephone unit 25 based on the data and processing operation corresponding to the option identified by the option number applied. This completes the description of the first case.

Next, an option designating operation in the second case will be described. The second case occurs when the processing candidate option is one in the group of options in the displayed range other than the option with the reference point having a minimum y-coordinate, and the user operates the select key 39 once in the downward tilting direction Hb. The processes carried out and results of determination made at steps a1–a9 are the same as in the first case, and will not be described again. After the movement is determined at step a10 to be downward, the operation proceeds to step a14.

At step a14, the display control unit 36 determines whether the current processing candidate option is the last option in the order of selection, i.e. the tenth option Ij. When it is the tenth option Ij, the operation proceeds from step a14 to step a21. Otherwise, the operation proceeds from step a14 to step a15. In the second case, the current processing candidate option is the fifth option Ie, and therefore the decision made at step a14 is negative. The processing operation then proceeds to step a15. At step a15, the display control unit 36 acts as the selection controller again to change the processing candidate option to the option immediately following the currently selected option in the order of selection. The specific method of this changing process is the same as the process carried out at step a12, except that the immediately following option is selected now. Consequently, the processing candidate option is changed from the fifth option Ie to the sixth option If in the second case.

At step a16, the display control unit 36 determines whether the processing candidate option updated at step a15 is excluded from the current group of options in the displayed range. This range of display is the one used in the latest execution of step a3. When the new processing candidate option is not in the current group of options in the displayed range, the operation proceeds from step a16 to step a18. When the updated processing candidate option is included in the current group of options in the displayed range, the operation returns straight from step a16 to step a3. In the second case of designating operation, the processing candidate option is the sixth option If and the group of options in the displayed range includes the third to eighth options Ic–Ih. Consequently, the decision made at step a a16 is negative, and the processing operation returns straight to step a3 to execute steps a3–a7.

Figure 11:
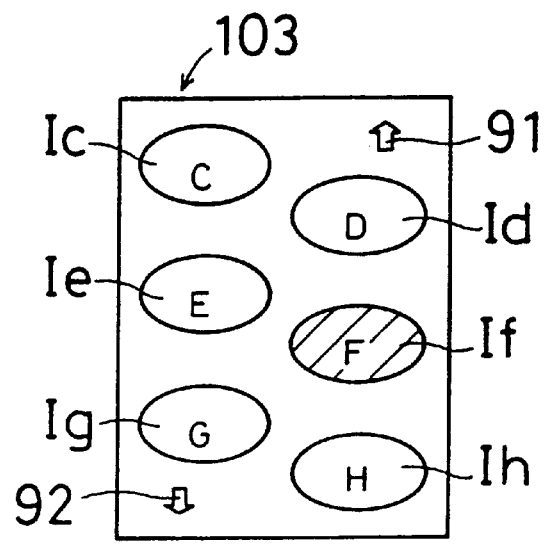
FIG. 11 is a view of a selection menu 103 displayed in the designating operation observed in a second case.

The processes performed at steps a3–a7 are the same as in the first case where the operation returns from step a13 to step a3, except that the new processing candidate option is the sixth option If. Consequently, the selection menu 103 shown in FIG. 11 is displayed in the display region 38. The selection menu 103 is different from the selection menu 101 in FIG. 9 in that the sixth option If is displayed in the second display mode and the fifth option Ie is now displayed in the first display mode. The two menus are the same in the other respects. The operation following displaying of the selection menu 103 is the same as the operation following displaying of the selection menu 102 in the first case. This completes the description of the second case.

Only by the flow of processes carried out at steps a1–a10, a12 and a15 described in the first and second cases, the processing candidate option among the plurality of options may be made definite in response to an operation of the select key 39. In the foregoing description, steps a11, a13, a14 and a16 relate to the third to sixth cases. Where the processing candidate is only changed among the plurality of options and made definite, these steps may be omitted, with the preceding and succeeding steps linked directly. Further, steps a4–a7 may be omitted, and so may be the display of the first and second signs 91 and 92.

Figure 12:
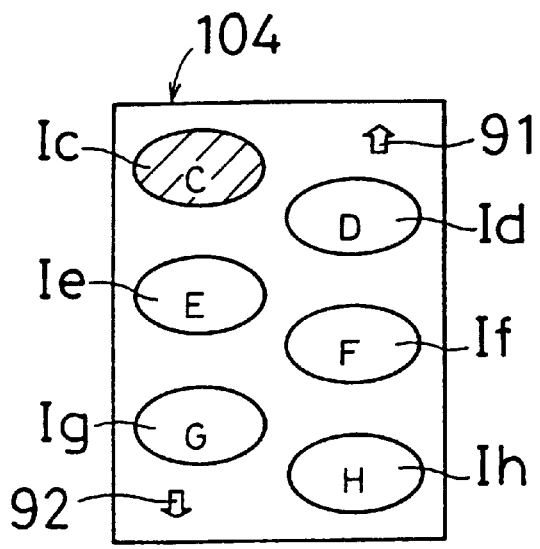
FIG. 12 is a view of a selection menu 104 displayed prior to the designating operation in a third case.

Next, an option designating operation in the third case will be described. The third case, roughly, is a case occurring when the processing candidate option is one with the reference point having a maximum y-coordinate in the group of options in the displayed range, and the user operates the select key 39 once in the upward tilting direction Ha. This state may be established, for example, by initialization or by repeating the operation described in the first and second cases. Thus, the third case will be described, starting at the point of time when the foregoing change operation is detected at step a8 after the initialization is effected at step a2, steps a3–a16 are repeated, and the selection menu 104 shown in FIG. 12 is displayed by the display processing performed at steps a3–a7. Only results of the processes at steps a8–a13 will be described since the processing sequence is the same as what has been described but the display state storage 35 stores different data then.

The processes carried out and results of determination made at steps a8–a12 are the same as in the first case. Thus, the processing candidate option is changed from the third option Ic to the second option Ib. In the third case, the current group of options in the displayed range includes the third to eighth options Ic–Ih. The second option Ib, which is the new processing candidate, is not included in the group of options in the displayed range. Consequently, the decision made at step a13 is positive, and the processing operation proceeds from step a13 to step a17.

At step a17, the display control unit 36 changes the group of options in the displayed range to include the new processing candidate option. Specifically, the coordinates of the display positions for arranging the reference points of the options in the current displayed range are stored in the cells of the arranging position data group 85 corresponding to the options immediately preceding the options in the current displayed range in the order of selection, respectively. The data in the remaining cells of the arranging position data group 85 are deleted therefrom. After changing the displayed range, the operation returns from step a17 to step a3. As a result, the storage state of menu data table 81 is changed from the state shown in FIG. 6 to the state shown in FIG. 13. The state shown in FIG. 13 is different from the state shown in FIG. 6 in that the coordinates of the first to sixth display positions are now stored, respectively, in the cells of the arranging position data group 85 corresponding to the second to seventh options Ib–Ig. The two states are the same in the other respects.

Figure 14:
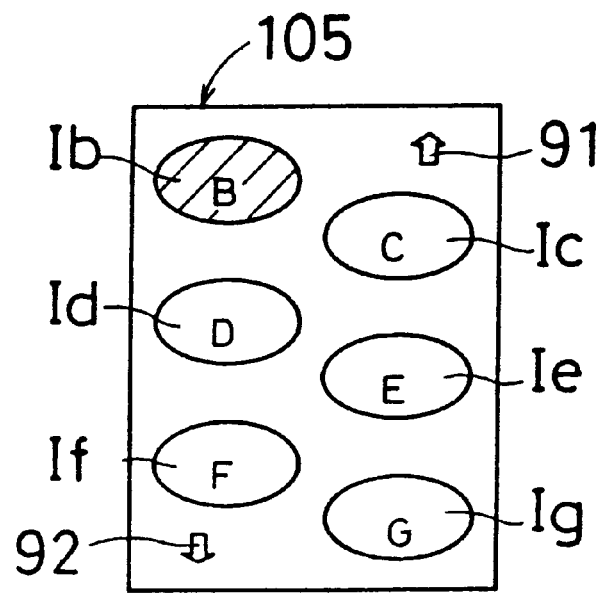
FIG. 14 is a view of a selection menu 105 displayed in the third case.

The processes performed at steps a3–a7 following the process of step a17 are the same as in the first case where the operation returns from step a13 to step a3, except that the menu data table 81 now stores data as shown in FIG. 13. Consequently, the selection menu 105 shown in FIG. 14 is displayed in the display region 38. The operation following displaying of the selection menu 105 is the same as the operation following displaying of the selection menu 102 in the first case. In the selection menu 105, the second to seventh options Ib–Ig are displayed in the standard arrangement, and the first and second signs 91 and 92 are also displayed. Further, the second option Ib which is the processing candidate is displayed in the second display mode, and the other options Ic–Ig in the first display mode.

A comparison between the selection menus 104 and 105 displayed before and after the operation of operating unit 32 will show that the options Ib–Ig displayed in the respective display positions in the latter selection menu 105 are each moved up by one in the order of selection from the options Ic–Ih displayed in the corresponding positions in the former selection menu 104. It will be seen that, as a result of the processes performed at steps a13 and a17, the options selected as the displayed range from among all the options Ia–Ij are moved up by one each. This completes the description of the third case.

Figure 15:
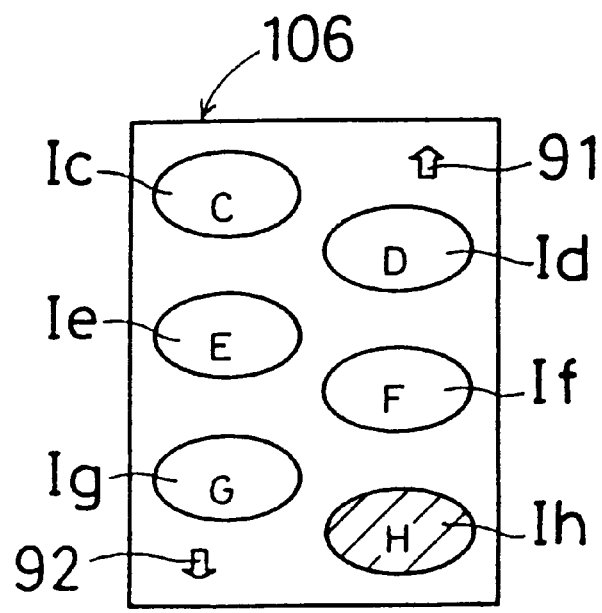
FIG. 15 is a view of a selection menu 106 displayed prior to the designating operation in a fourth case.

Next, an option designating operation in the fourth case will be described. The fourth case, roughly, is a case occurring when the processing candidate option is one with the reference point having a minimum y-coordinate in the group of options in the displayed range, and the user operates the select key 39 once in the downward tilting direction Hb. This state may be established, for example, by initialization or by repeating the operation described in the first and second cases. Thus, the fourth case will be described, starting at the point of time when the foregoing change operation is detected at step a8 after the initialization is effected at step a2, steps a3–a16 are repeated, and the selection menu 106 shown in FIG. 15 is displayed by the display processing performed at steps a3–a7. Only results of the processes at steps a8–a10 and a14–a16 will be described since the processing sequence is the same as what has been described but the display state storage 35 stores different data then.

The processes carried out and results of determination made at steps a8–a10 and a14–a16 are the same as in the second case. Thus, the processing candidate option is changed from the eighth option Ih to the ninth option Ii. In the fourth case, the current group of options in the displayed range includes the fourth to eighth options Ic–Ih. The ninth option Ii, which is the new processing candidate, is not included in the current group of options in the displayed range. Consequently, the decision made at step a16 is positive, and the processing operation proceeds from step a16 to step a18.

Figures 16, 17:
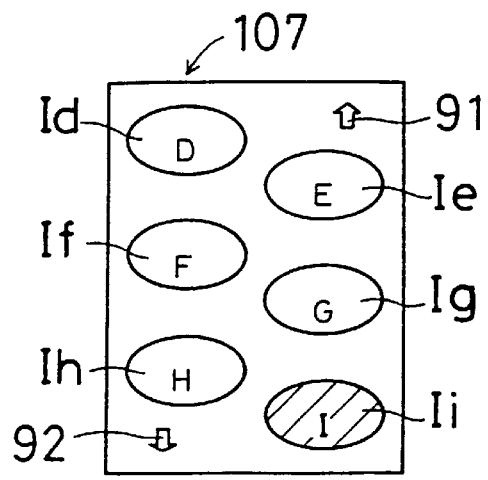
FIG. 16 is a view showing a storage state of the menu data table 81 after a change operation in the fourth case.
FIG. 17 is a view of a selection menu 107 displayed in the fourth case.

At step a18, the display control unit 36 changes the group of options in the displayed range to include the new processing candidate option. Specifically, the coordinates of the display positions for arranging the reference points of the options in the current displayed range are stored in the cells of the arranging position data group 85 corresponding to the options immediately following the options in the current displayed range in the order of selection, respectively. The data in the remaining cells of the group of arranging position data 85 are deleted therefrom. After changing the displayed range, the operation returns from step a18 to step a3. As a result, the storage state of menu data table 81 is changed from the state shown in FIG. 6 to the state shown in FIG. 16. The state shown in FIG. 16 is different from the state shown in FIG. 6 in that the coordinates of the first to sixth display positions are now stored, respectively, in the cells of the arranging position data group 85 corresponding to the fourth to ninth options Id–Ii. The two states are the same in the other respects.

The processes performed at steps a3–a7 following the process of step a18 are the same as in the second case where the operation returns from step a16 to step a3, except that the menu data table 81 now stores data as shown in FIG. 16. Consequently, the selection menu 107 shown in FIG. 17 is displayed in the display region 38. The operation following displaying of the selection menu 107 is the same as the operation following displaying of the selection menu 103 in the second case. In the selection menu 107, the fourth to ninth options Id–Ii are displayed in the standard arrangement, and the first and second signs 91 and 92 are also displayed. Further, the ninth option Ii which is the processing candidate is displayed in the second display mode, and the other options Id–Ih in the first display mode.

A comparison between the selection menus 106 and 107 displayed before and after the operation of operating unit 32 will show that the options Id–Ii displayed in the respective display positions in the latter selection menu 107 are each moved down by one in the order of selection from the options Ic–Ih displayed in the corresponding positions in the former selection menu 106. It will be seen that, as a result of the processes performed at steps a16 and a18, the options selected as the displayed range from among all the options Ia–Ij are moved down by one each. This completes the description of the fourth case.

The processes performed at steps a13 and a16–a18 in the third and fourth case constitute a displayed range update processing for moving the group of options in the displayed range up and down in response to a change in the processing candidate option. The processing candidate option may be displayed constantly in the display region 38 by adding the displayed range update processing to the flow of processes consisting only of the steps described in the first and second case. Where the number of all options Ia–Ij exceeds the number of display positions set to the standard arrangement, the options may be displayed successively as the processing candidate option is changed. In this case, the operation for selecting the processing candidate option serves also as an operation for displaying options not displayed in the display region 38. Then, the user may easily select a desired option from among all the options Ia–Ij.

Figures 18, 19:
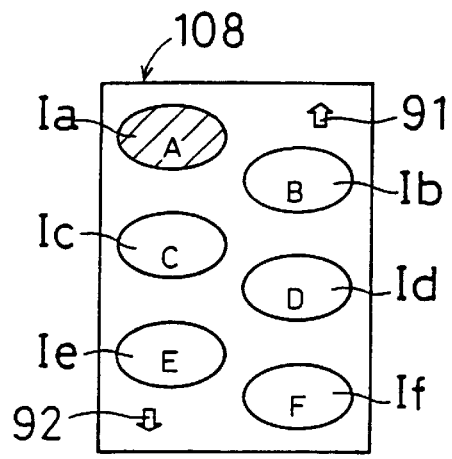
FIG. 18 is a view of a selection menu 108 displayed prior to the designating operation in a fifth case.
FIG. 19 is a view showing a storage state of the menu data table 81 at a point of time when the selection menu 108 is displayed in the fifth case.

Next, a designating operation in the fifth case will be described. The fifth case, roughly, is a case occurring when the processing candidate option is the first in the order of selection, and the user operates the select key 39 once in the upward tilting direction Ha. This state may be established, for example, by initialization or by repeating the operation described in the first to fourth cases or the operation described in the first and second cases. Thus, the fifth case will be described, starting at the point of time when the foregoing change operation is detected at step a8 after the initialization is effected at step a2 and the selection menu 108 shown in FIG. 18 is displayed by repeating steps a3–a18. When the first option in the order of selection is included in the group of options in the displayed range, the decision made at step a4 for displaying the selection menu 108 is positive since the last option is earlier in the order of selection than the first option. Consequently, the first sign 91 is displayed in the selection menu 108.

FIG. 19 shows a storage state of menu data table 81 at the point of time when the above change operation is detected at step a8. The candidate processing option at this point of time is the first option Ia. The storage state of menu data table 81 shown in FIG. 19 is different from the state shown in FIG. 6 in that the coordinates of the first to sixth display positions are stored, respectively, in the cells of the arranging position data group 85 corresponding to the first to sixth options Ia–If. The two states are the same in the other respects. The processes carried out and results of determination made at steps a8–a10 are the same as in the first case, the operation proceeds from step a10 to step a11. Since the first option Ia is selected as the processing candidate at this point of time, the decision made at step a11 is positive and the operation proceeds from step a11 to step a19.

Figures 20, 21:
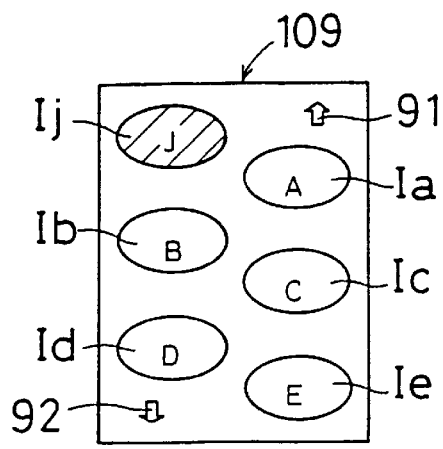
FIG. 20 is a view showing a storage state of the menu data table 81 after a change operation in the fifth case.
FIG. 21 is a view of a selection menu 109 displayed in the fifth case.

At step a19, the display control unit 36 selects options consecutive from the first option in the order of selection which are one less in number than the predetermined number of options to be displayed, and selects the last option In the order of selection, and changes the group of options In the displayed range to these options selected. Specifically, this process is different from the process of step a17 in that the tenth and first to fifth options Ij and Ia–Ie are now selected as the displayed range. The two processes are the same in the other respects. As a result, the storage state of menu data table 81 is changed from the state shown in FIG. 19 to the state shown in FIG. 20. The storage state of menu data table 81 shown in FIG. 20 is different from the state shown in FIG. 19 in that the coordinates of the first to sixth display positions are stored, respectively, in the cells of arranging position data group 85 corresponding to the tenth and first to fifth options Ij and Ia–Ie. The two states are the same in the other respects.

Next, at step a20, the display control unit 36 acts as a selection controller to select the last option in the order of selection as the processing candidate option, and update the option number of the processing candidate option stored in the display state storage 35 with the option number of the newly selected processing candidate option. That is, among the options selected as the displayed range at step a19, the option having the reference point to be displayed in the first display position is select ed as the processing candidate option. As a result, the processing candidate option is changed from the first option to the last option in the order of selection. After changing the processing candidate, the operation returns from step a20 to step a3.

The processes performed at steps a3–a7 following the process of step a20 are the same as in the first case where the operation returns from step a13 to step a3, except that the menu data table 81 now stores data as shown in FIG. 20. Consequently, the selection menu 109 shown in FIG. 21 is displayed in the display region 38. The operation following displaying of the selection menu 109 is the same as the operation following displaying of the selection menu 102 in the first case. In the selection menu 109, the tenth and first to fifth options Ij and Ia–Ie are displayed in the stated order in the first to sixth positions in the standard arrangement, and the first and second signs 91 and 92 are also displayed. Further, the tenth option Ij which is the processing candidate is displayed in the second display mode, and the other options Ia–Ie in the first display mode. This completes the description of the fifth case.

Figures 22, 23:
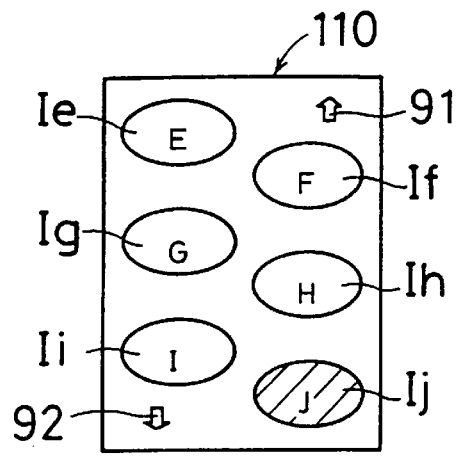
FIG. 22 is a view of a selection menu 110 displayed prior to the designating operation in a sixth case.
FIG. 23 is a view showing a storage state of the menu data table 81 at a point of time when the selection menu 108 is displayed in the sixth case.

Next, a designating operation in the sixth case will be described. The sixth case, roughly, is a case occurring when the processing candidate option is the last in the order of selection, and the user operates the select key 39 once in the downward tilting direction Hb. This state may be established, for example, by initialization or by repeating the operation described in the first to fourth cases or the operation described in the first and second cases. Thus, the sixth case will be described, starting at the point of time when the foregoing change operation is detected at step a8 after the initialization is effected at step a2 and the selection menu 110 shown in FIG. 22 is displayed by performing the display processing at steps a3–a7. When the last option in the order of selection is included in the group of options In the displayed range, the decision made at step a6 for displaying the selection menu 110 is positive since the first option is later in the order of selection than the last option. Consequently, the second sign 92 is displayed in the selection menu 110.

FIG. 23 shows a storage state of menu data table 81 at the point of time when the above change operation is detected at step a8. The candidate processing option at this point of time is the tenth option Ij. The storage state of menu data table 81 shown in FIG. 23 is different from the state shown in FIG. 6 in that the coordinates of the first to sixth display positions are stored, respectively, in the cells of the arranging position data group 85 corresponding to the fifth to tenth options Ie–Ij. The two states are the same in the other respects. The processes carried out and results of determination made at steps a8–a10 are the same as in the second case, the operation proceeds from step a10 to step a14. Since the tenth option Ij is selected as the processing candidate at this point of time, the decision made at step a14 is positive and the operation proceeds from step a14 to step a21.

Figures 24, 25:
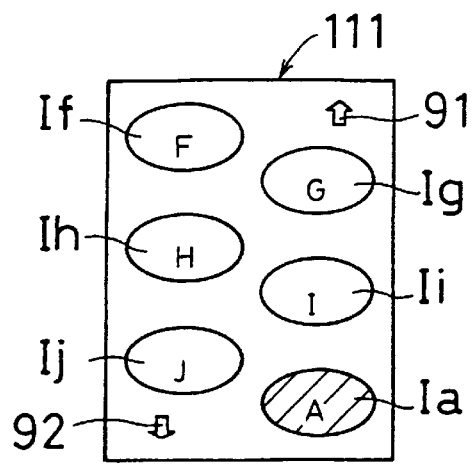
FIG. 24 is a view showing a storage state of the menu data table 81 after a change operation in the sixth case.
FIG. 25 is a view of a selection menu 111 displayed in the sixth case.

At step a21, the display control unit 36 selects options consecutive in the reversed order of selection from the last option which are one less in number than the predetermined number of options to be displayed, and selects the first option in the order of selection, and changes the group of options in the displayed range to these options selected. Specifically, this process is different from the process of step a18 in that the sixth to tenth and first options If–Ij and Ia are now selected as the displayed range. The two processes are the same in the other respects. As a result, the storage state of menu data table 81 is changed from the state shown in FIG. 23 to the state shown in FIG. 24. The storage state of menu data table 81 shown in FIG. 24 is different from the state shown in FIG. 23 in that the coordinates of the first to sixth display positions are stored, respectively, in the cells of arranging position data group 85 corresponding to the sixth to tenth and first options If–Ij and Ia. The two states are the same in the other respects.

Next, at step a22, the display control unit 36 acts as a selection controller to select the first option in the order of selection as the processing candidate option, and update the option number of the processing candidate option stored in the display state storage 35 with the option number of the newly selected processing candidate option. That is, among the options selected as the displayed range at step a21, the option having the reference point to be displayed in the sixth display position is selected as the processing candidate option. As a result, the processing candidate option is changed from the last option to the first option in the order of selection. After changing the processing candidate, the operation returns from step a22 to step a3.

The processes performed at steps a3–a7 following the process of step a22 are the same as in the first case where the operation returns from step a13 to step a3, except that the menu data table 81 now stores data as shown in FIG. 24. Consequently, the selection menu 111 shown in FIG. 25 is displayed in the display region 38. The operation following displaying of the selection menu 111 is the same as the operation following displaying of the selection menu 102 in the first case. In the selection menu 111, the sixth to tenth and first options If–Ij and Ia are displayed in the stated order in the first to sixth positions in the standard arrangement, and the first and second signs 91 and 92 are also displayed. Further, the first option Ia which is the processing candidate is displayed in the second display mode, and the other options If–Ij in the first display mode. This completes the description of the sixth case.

In the fifth and sixth cases, steps a11, a12, a21 and a22 are added to the flow of processes described in the first and second case or the flow of processes described in the first to fourth case. These added steps are executed to determine a group of options in the displayed range and a processing candidate option, thereby joining the first and last options in the order of selection to eliminate ends from the order of selection, i.e. to render the order of selection endless. Thus, when the user repeatedly tilts the select key 39 in one direction Ha, the options from first to last in the order of selection are successively selected as the processing candidate, and then the first option is selected again. When the user repeatedly tilts the select key 39 in the opposite direction Hb, the options from last to first in the order of selection are successively selected as the processing candidate, and then the last option again. In this way, the options to be selected for processing circulate in response to the operations of select key 39.

It is thus unnecessary to reverse the direction of operation of select key 39 when the selection reaches the first or last option, which facilitates the user's operation. In the fifth and sixth cases, steps a19 and a21 corresponding to the displayed range update processing are added to the above flow of processes. Consequently, the display range update processing may be achieved advantageously also when the processing candidate option is changed from the last option to the first option in the order of selection and vice versa. The above completes the description of the designating operation shown in FIGS. 7 and 8.

As described with reference to FIGS. 7 and 8, the plurality of options are displayed in the display region 38 as arranged in rows and columns and having coordinates not overlapping in the direction parallel to the reference axis. In this case, the order of selection may be guessed with ease since the direction of the reference axis is evident. At the same time, an increased number of options may be displayed in the display region 38 at a time, as compared with the case of arranging the options in one column parallel to the reference axis. In the above arrangement, the reference points of the options have coordinates increasing in the parallel direction as the options are earlier or later in the order of selection. When a selecting operation is carried out using the select key 38, the processing candidate option shifts toward an end in the direction parallel to the reference axis with each operation of the select key 38. Such movement of the processing candidate option appears natural to the user. Thus, the user can readily guess the order of selection of the options only by looking at the selection menus.

As a first modified example of designating operation, when an instruction is inputted for a further upward movement from the first option selected as the processing candidate or for a further downward movement from the last option selected as the processing candidate, the instruction may be disregarded without circulating the order of selection. For this purpose, the flow charts of FIGS. 7 and 8 may be modified to delete steps a19–a22, and return the operation straight to step a8 as indicated in broken lines when the decisions made at steps a11 and a14 are positive. Consequently, when the processing candidate option is at an end of menu data table 81 and an operation is entered to designate a direction for departing from the menu data table 81, the operation is disregarded to maintain the processing candidate option and the group of options in the displayed range as they are. This simplifies the designating operation.

As a second modified example of designating operation, the user may be allowed to make a setting beforehand whether to circulate the order of selection or not. This setting may be made by the user at any time. For this purpose, the flow charts of FIGS. 7 and 8 may additionally include, between steps a11 and a19 and between steps a14 and a21, steps for determining whether or not to circulate the order of selection according to a setting made by the user. Only when these steps indicate that the order of selection should be circulated, steps a19 and a20 or a21 and a22 are executed. Otherwise, the operation is made to return from the added steps to step a3. This modification allows the user to determine whether to circulate the order of selection or not, whichever is convenient in view of a use situation of the input apparatus 23. Thus, the input apparatus 23 may be used with enhanced facility.

In the above two modified examples of designating operation, steps a4 and a5 are skipped so as not to display the sign 91 when the order of selection is not circulated and the earliest option in the order of selection in the group of options in the displayed range is the first option Ia in the order of selection. Similarly, steps a6 and a7 are skipped so as not to display the sign 92 when the latest option in the order of selection in the group of options in the displayed range is the first option Ij in the order of selection. Consequently, a clear indication is given to the user that there is no option earlier or later in the order of selection than the currently displayed group of options.

In the foregoing designating operation, the group of options in the displayed range has predetermined display positions in the display region. Consequently, the order of selection and the number of options currently displayed are always in a fixed positional relationship. The user may readily recognize the order of selection only by looking the selection menu even where the options are arranged in an approximately matrix form, and the select key is operable to designate only the two opposite directions. Where the display positions are fixed as above, and when the group of options in the displayed range is moved up by one, the options displayed in the display region 38 both before and after the upward movement shift to the column different from the column in which these options were arranged before the upward movement. A similar shift takes place also when the group of options in the displayed range is moved down by one.

As a third modified example of designating operation, the options in the displayed range may be displayed in a fixed column at all times. For this purpose, the display control unit 36 first assumes a virtual arrangement having the same number of columns as and a larger number of rows than the standard arrangement for displaying all options Ia–Ij at a time, and a virtual region of a size necessary to display the virtual arrangement at a time. This virtual region in this embodiment, for example, has the same dimension in the x-direction as the display region 38, and a larger dimension in the y-direction than the display region 38. Further, all the options Ia–Ij have positions of their reference points arranged in this virtual region according to the virtual arrangement set as virtual positions of the respective options Ia–Ij. These positions are stored as a virtual position data group in the cells corresponding to the cells of the number data group 83 in the menu data table 81. This virtual position data group is functionally included in the option storage 34. In this case, the reference points of later options in the order of selection are arranged in the virtual positions of larger y-coordinates in the virtual arrangement.

For the group of options in the displayed range to be displayed by using the option storage 34 storing the virtual position data group, the display control unit 36 first determines an offset value representing a distance of upward or downward movement in response to a key operation instructing a scrolling, and adds or subtracts the offset value to/from the y-coordinates of the virtual positions. Further, in response to results of the addition or subtraction, the display control unit 36 determines a portion corresponding to an actual display region in the virtual region, and causes this portion to be displayed in the display region 38.

Figure 26:
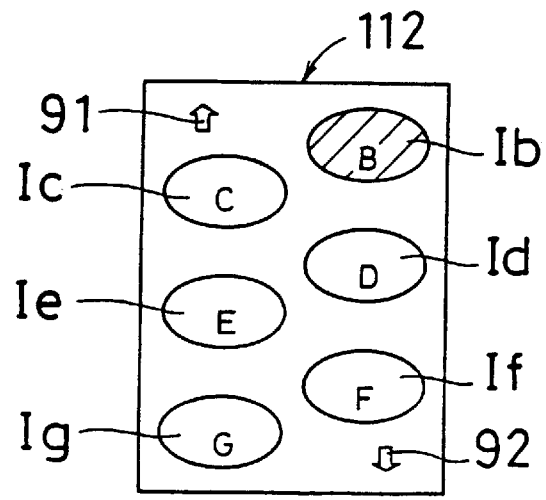
FIG. 26 is a view of a selection menu 112 displayed in the third case in one of the modified examples of designating operation.

When, for example, the selection menu 104 of FIG. 12 is displayed and the select key 39 is tilted in the upward direction Ha as in the third case described hereinbefore, the third modified example of designating operation causes the selection menu 112 of FIG. 26 to be displayed in the display region 38 in place of the selection menu 105. In the selection menu 112, the x-coordinates of the reference points of option Ic–Ig displayed in both selection menus 104 and 112 displayed before and after the operation remain unchanged from those in the selection menu 104, with only they-coordinates changed. Thus, the options Ic–Ig displayed in both menus appear to have moved parallel to the y–axis from the positions before the operation of select key 39. In the selection menu 105, the reference point of the uppermost option in the left column has a smaller y-coordinate value than that of the uppermost option in the right column. In selection menu 112, the reference point of the uppermost option in the left column has a larger y-coordinate value than that of the uppermost option in the right column.

That is, in the third modified example of designating operation, the display range is changed by vertically scrolling the menu. As a result, the user may recognize, with greater facility, the order of selection only by looking the selection menu where the options are arranged in an approximately matrix form, and the select key is operable to designate only the two opposite directions. A scroll key may be provided separately from the select key 39 to effect scrolling as a separate operation from changing of the processing candidate option. The processing candidate option may be displayed constantly in the display region by determining a distance of movement in response to an operation of select key 39, thereby to simplify the operation.

The reference axis may be any one of the coordinate axes in the coordinate system set to the display region 38, or may be different from these coordinate axes. In the description of the input apparatus 23 in the foregoing embodiments, the rows may be replaced with the perpendicular segments of the virtual lattice of the standard arrangement, and the columns with the parallel segments of the virtual lattice. By performing an option designating operation based on the description after the replacement, a plurality of options may be displayed in an arrangement in which the reference points have different coordinates in the direction parallel the reference axis, and the plurality of options form a plurality of rows and a plurality of columns. Thus, the user may readily grasp the order of selection when selecting an option for processing, by using the operating unit for effecting operations corresponding to the directions parallel to the reference axis.

Figure 27:
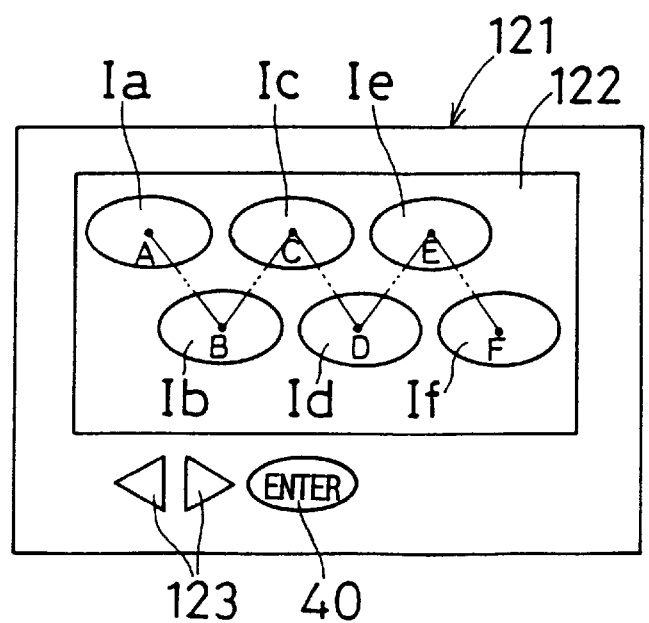
FIG. 27 is a front view showing a first modified example of outward appearance of the portable telephone 21.

Preferably, the reference axis is, for example, the axis corresponding to the larger of the vertical and sideways dimensions of the display region 38. As shown in FIG. 27, for example, a portable telephone 121 has a sideways elongated display region 122 which is larger in the x-direction than in the y-direction. In this case, select keys 123 are operable to designate movement in two opposite directions parallel to the x-axis. The options in the displayed range may be arranged, with the reference points thereof having x-coordinates not overlapping one another, in a standard arrangement setting one of n display positions to each column in a virtual lattice of m rows and n columns. In the example shown in FIG. 27, options Ia–If are arranged one each in the column s of a virtual lattice having two rows and six columns, and different columns intersect the rows in any two adjacent display positions.

Figure 28:
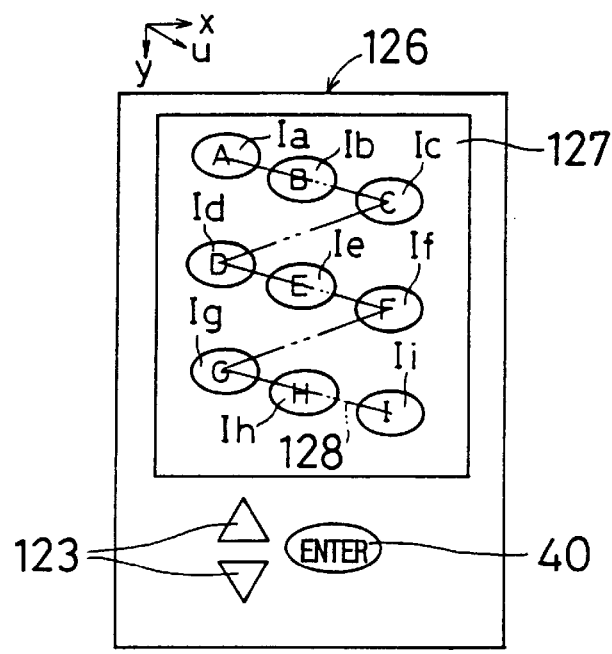
FIG. 28 is a front view showing a second modified example of outward appearance of the portable telephone 21.
Figure 29:
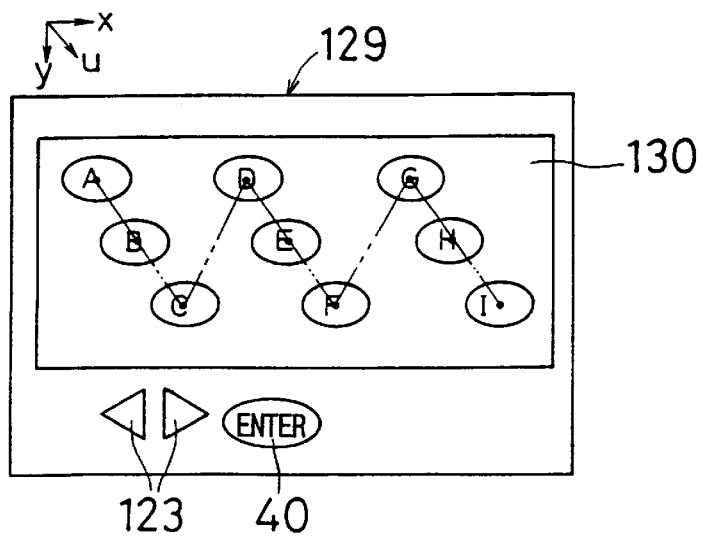
FIG. 29 is a front view showing a third modified example of outward appearance of the portable telephone 21.

The numbers of rows and columns in the standard arrangement are not limited to those in the foregoing description, but may be any plural numbers. FIG. 28 shows a portable telephone 126 having a vertically elongated display region 127, for example. In this case, nine options Ia–Ii may be displayed in the display region 127 at a time based on a standard arrangement where the y-axis acts as the reference axis, and nine display positions are set one each to the rows of a virtual lattice of nine rows and three columns. The nine rows are divided into three groups of three consecutive rows. The display positions in each group have x-coordinates increasing with y-coordinates. Consequently, a sawtooth-shaped standard arrangement line 128 links the display positions in this standard arrangement in the ascending order of y-coordinates. FIG. 29 shows a portable telephone 129 having a sideways elongated display region 130. In this case, nine opt ions Ia–Ii may be displayed in the display region 130 at a time based on a standard arrangement where the x-axis acts as the reference axis, and nine display positions are set one each to the columns of a virtual lattice of three rows and nine columns.

Figure 30:
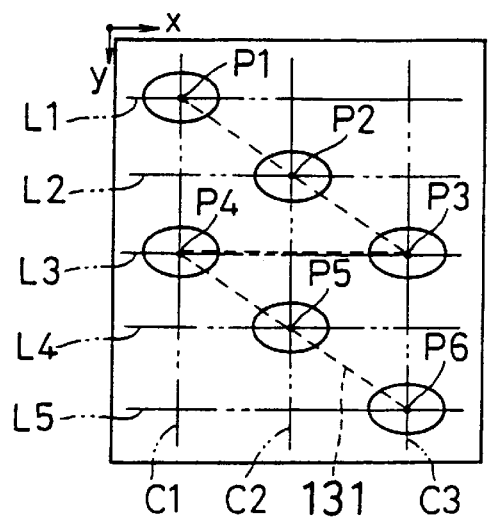
FIG. 30 is a view showing another example of standard arrangement.
Figure 31:
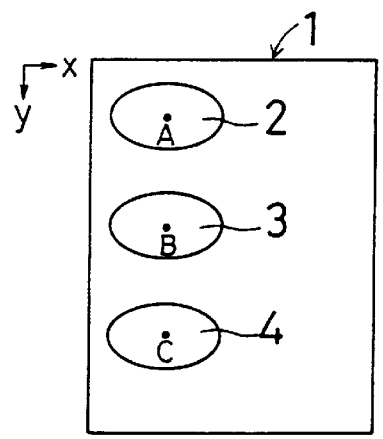
FIG. 31 is a view showing an example of arrangement of options in the prior art.
Figure 32:
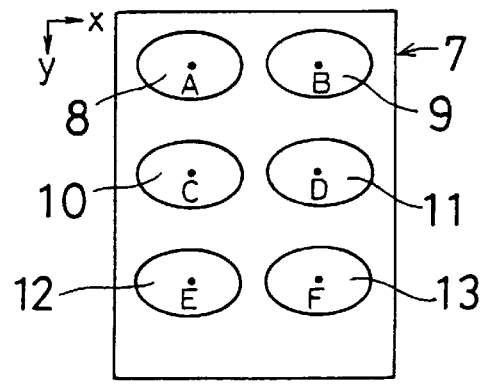
FIG. 32 is a view showing another example of arrangement of options in the prior art.

Further, as long as the standard arrangement line extends zigzag, the reference points of part of the plurality of options may have coordinates overlapping in the direction parallel to the reference axis. That is, as shown in FIG. 30, parts of a standard arrangement line 131 may be segments perpendicular to the reference axis. In this case, the group of options in the displayed range is arranged on a plurality of imaginary segments parallel to an oblique direction U. The reference point of the option having a maximum coordinate in the direction parallel to the reference axis, among the options arranged on one of the oblique segments, and the reference point of the option having a minimum coordinate in the direction parallel to the reference axis, among the options arranged on the other oblique segment, are arranged on a straight line perpendicular to the reference axis.

In this case, a standard arrangement, where the reference axis is the y-axis and display positions are set to the rows in a lattice of m rows and n columns, includes rows each having two display positions set thereto. It is therefore possible to set display positions exceeding the number of rows by using a virtual lattice of m rows and n columns. In the example shown in FIG. 30, six display positions P1–P6 are set to a virtual lattice of five rows and three columns. The first to third display positions P1–P3 are arranged on the first imaginary segment in the oblique direction U, and the fourth to sixth display positions on the second imaginary segment in the oblique direction U. The third and fourth display positions P3 and P4 are set to one perpendicular segment L3. Thus, by using the standard arrangements of the other examples, it is possible to display a larger number of options in the display region 38 at a time than the number of perpendicular segments. The standard arrangements are not limited to those in which the standard arrangement line has a cyclic, sawtooth-like shape, but may be other arrangements.

As shown in FIGS. 27 through 29, the seesaw switch or lever switch acting as the select key 39 may be replaced with a tact switch comprising two keys assigned to the two opposite directions, respectively. Further, a pointing device such as a jog shuttle for one-dimensionally selecting the options may be used as the select key. Further, the select key 39 may have any type of construction for designating directions parallel to the reference axis. The select key 39 may be the type for designating the two opposite directions or the type for designating only one of these directions.

A so-called tablet may be used for the operating unit 32, which is a coordinate input device or pointing device operable to select desired points in the display region 38. Since the options are arranged in a matrix-like form, it gives no sense of incongruity when selecting, by using a coordinate input device, one of the options from a selection menu displayed by the display processing of the described input apparatus 23. Thus, where an operating device such as the select key for designating one-dimensional movement and an operating device such as the coordinate input device for designating two-dimensional movement are used together, and the options are displayed in the standard arrangement by the input apparatus 23, the displayed state of the options facilitates use of both operating devices. Thus, the input apparatus 23 may further include an operating device for designating two-dimensional movement.

The input apparatus 23 of portable telephone 21 in the foregoing embodiments and the description thereof are illustrative of the apparatus and method according to the present invention. The invention may be implemented in various other forms as long as the principal operations are the same. In particular, the detailed operations of the respective components are not limited to the foregoing description, but may be realized in different ways as long as the same processing results are obtained. This input apparatus 23 and the described designating method may be used singly as an input apparatus and method for selecting one option from among a plurality of options.

The input apparatus and method according to the invention are not limited to portable telephones, but may be applied to other types of processing apparatus. That is, in a processing apparatus including a controller for carrying out processes based on a processing operation or data set individually to a plurality of options, the input apparatus of the present invention may be used as an input device for selecting one of the options, wherein the controller carries out processes based on a processing operation or data set to the option selected by the input device. Portable information processing apparatus in particular are required to be as small as possible. It is difficult to provide four-direction cursor keys for such an apparatus. It is therefore desirable to designate a processing operation and data by using these input apparatus and method.

These input apparatus and method may be implemented by storing software including programs and data for causing a central processing circuit to carry out the described designating operation, in a storage medium readable by a computer, installing this software in the computer, and causing the central processing circuit to run the program. The storage medium may be a CD-ROM or floppy disks, for example. The options may be selected as described hereinbefore by designating only one or two of the plurality of directions which may be designated by operating the keyboard and/or mouse of the computer. Thus, the operation is simplified.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An apparatus having a display including a display region with a preset coordinate system, and a selector, the apparatus comprising:

a display controller for controlling display of a plurality of selectable options including image information, the options being selectable in a predetermined two-dimensional order of selection in the display region of the display arrangement that predetermined reference points within the options have not overlap, and the options being displayed in a plurality of rows and a plurality of columns, wherein options in at least one of the rows and columns are offset from one another; and a selector controller for controlling selection of one option from among the plurality of options, the options being selectable in a predetermined two-dimensional order of selection in response to an operation of the selector, operable in only one of the two dimensions.

2. The apparatus of claim 1, wherein the display controller causes a predetermined number of options, including the one option selected, and other options consecutive in the predetermined two-dimensional order of selection, to be displayed in the display region.

3. An apparatus having a display including a display region with a preset coordinate system, and a selector, the apparatus comprising:

display controller for arranging a plurality of selectable options including image information, the options being selectable in a predetermined two-dimensional order of selection in a virtual region, larger that the display region, and the options being displayed in a plurality of rows and a plurality of columns, wherein options in at least one of the rows and columns are offset from one another, the display controller further for controlling display in a portion of the virtual region congruent with the display region in the display region of the display; and a selector controller for controlling selection of one option from among the plurality of options, the options being selectable in a predetermined two-dimensional order of selection in response to an operation of the selector, operable in only one of the two dimensions.

4. The apparatus of claim 2 or 3, wherein the display controller causes, when there is an option outside the display region and consecutive in the predetermined two-dimensional order of selection with one of the options disposed relatively closest to an end of the display region, a predetermined graphic is displayed in the display region to indicate the presence of such an option.

5. The apparatus of claim 2 or 3, wherein the section controller changes the one option selected to a last or first option in the predetermined two-dimensional order of selection, when the one option selected is the first or last option in the predetermined two-dimensional order of selection and the selector is operated.

6. The apparatus of claim 1, wherein the display controller increases or decreases coordinates of the options with an increase in number in the order or selection.

7. The apparatus of claim 1, wherein the plurality of options are linked by a virtual zig-zag line in the predetermined two-dimensional selection order.

8. A method, in which a plurality of selectable options including image information and having a predetermined order of selection are displayed in a display region with a preset coordinate system, and in which one option is selected from among the plurality of options, the method comprising:

causing the plurality of option to be displayed in the display region in such an arrangement that the options are displayed in a predetermined two-dimensional order of selection, and causing the options to be displayed in a plurality of rows and a plurality of columns, wherein options in at least one of the rows and columns are offset from one another; and changing the selectable option in the predetermined two-dimensional order of selection each time a selector is operated wherein the selector is operable in only one of the two dimension.

9. The method of claim 8, wherein a predetermined number of options, including the one option selected and other options consecutive in the predetermined two-dimensional order of selection, are displayed in the display region.

10. A method, in which a plurality of selectable options including image information and having a predetermined order of selection are displayed in a display region with a preset coordinate system, and in which one option is selected from among the plurality of options, the method comprising:

arranging the plurality of options, selectable in a predetermined two-dimensional order of selection, in a virtual region, larger than the display region, in a plurality of rows and a plurality of columns, and displaying a portion of the virtual region congruent with the display region in the display region, the options in at least one of the rows and columns being offset from one another; and changing the selectable option in the predetermined two-dimensional order selection each time a selector is operated, wherein the selector is operable in only one of the two dimensions.

11. The method of claim 9 or 10, wherein, when there is an option outside the display region and consecutive in the predetermined two-dimensional order of selection with one of the options disposed relatively closest to an end of the display region, a predetermined graphic is additionally displayed in the display region to indicate the presence of such an option.

12. The method of claim 9 or 10, wherein, when the selectable option is the first or last option in the predetermined two-dimensional order of selection, the one option selected is changed to the last or first option in the predetermined two-dimensional order of selection when the selector is operated.

* * * * *